United States Patent
Watanabe

(10) Patent No.: US 7,643,224 B2
(45) Date of Patent: Jan. 5, 2010

(54) ZOOM LENS AND IMAGE PICKUP APPARATUS EQUIPPED WITH SAME

(75) Inventor: Masahito Watanabe, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 12/313,808

(22) Filed: Nov. 24, 2008

(65) Prior Publication Data

US 2009/0174949 A1    Jul. 9, 2009

(30) Foreign Application Priority Data

Nov. 29, 2007    (JP)    ............... 2007-309052

(51) Int. Cl.
    *G02B 15/14*    (2006.01)
(52) U.S. Cl. ...................... 359/690; 359/687
(58) Field of Classification Search ................ 359/687, 359/690
    See application file for complete search history.

(56) References Cited

U.S. PATENT DOCUMENTS 7,151,638 B2    12/2006    Ohashi

2005/0190457 A1    9/2005    Ohashi
2006/0098301 A1    5/2006    Miyajima
2008/0019018 A1*    1/2008    Ito .............................. 359/687

FOREIGN PATENT DOCUMENTS

| JP | 2005-242116 | 9/2005 |
|---|---|---|
| JP | 2005-326743 | 11/2005 |
| JP | 2006-078979 | 3/2006 |
| JP | 2006-133631 | 5/2006 |
| JP | 2006-171055 | 6/2006 |

* cited by examiner

*Primary Examiner*—Scott J Sugarman
(74) *Attorney, Agent, or Firm*—Kenyon & Kenyon LLP

(57) ABSTRACT

A zoom lens includes a positive first lens unit G1, a negative second lens unit G2 and a rear group having a positive refracting power having at least one lens unit. The lens unit located closest to the object side in the rear grout is a third lens unit G3 having a positive refracting power. The zoom lens has an aperture stop S disposed closer to the image side than the second lens unit G2 and closer to the object side than the lens surface located closest to the image side in the third lens unit G3. The zoom lens satisfies a prescribed conditional expression.

18 Claims, 14 Drawing Sheets

ZOOM LENS AND IMAGE PICKUP APPARATUS EQUIPPED WITH SAME

CROSS-REFERENCE TO RELATED APPLICATION

The present application is based upon and claims the benefit of priority from the prior Japanese Patent Application No. 2007-309052 filed on Nov. 29, 2007; the entire contents of which are incorporated herein by reference.

BACKGROUND OF THE INVENTION

1. Field of the Invention

The present invention relates to a zoom lens and an image pickup apparatus equipped with the same.

2. Description of the Related Art

In recent years, digital cameras that pick up an image of an object using an image pickup element such as a CCD or CMOS sensor have replaced film cameras to become the mainstream.

Among such digital cameras, cameras of a type that is small in the dimension with respect to the thickness direction (i.e. direction along the optical axis) to facilitate portability have been favored.

On the other hand, although the zoom ratios of zoom lenses used in compact digital cameras are typically about three, zoom lenses having higher zoom ratios are demanded recently.

There is a known type of zoom lens that can easily achieve a high zoom ratio, that is, a zoom lens having three or more lens units including, in order from the object side thereof, a first lens unit having a positive refracting power, a second lens unit having a negative refracting power and a rear group having a positive refracting power, the lens unit located closest to the object side in the rear group being a third lens unit having a positive refracting power.

For example, Japanese Patent Application Laid-Open Nos. 2005-242116, 2005-326743 and 2006-78979 disclose zoom lenses having a zoom ratio of about 4.5. Furthermore, Japanese Patent Application Laid-Open Nos. 2006-171055 and 2006-133631 disclose zoom lenses having a higher zoom ratio of about 10.

SUMMARY OF THE INVENTION

According to one aspect of the present invention, there is provided a zoom lens comprising, in order from the object side thereof:

a first lens unit having a positive refracting power;

a second lens unit having a negative refracting power; and a rear group having a positive refracting power that comprises at least one lens unit, the lens unit located closest to the object side in the rear group being a third lens unit having a positive refracting power, wherein the zoom lens comprises an aperture stop disposed closer to the image side than the second lens unit and closer to the object side than the lens surface closest to the image side in the third lens unit, during zooming from the wide angle end to the telephoto end in a state in which the zoom lens is focused on an object at the farthest distance, the distance between the first lens unit and the second lens unit is larger at the telephoto end than at the wide angle end, and the distance between the second lens unit and the third lens unit is smaller at the telephoto end than at the wide angle end, the first lens unit moves during zooming from the wide angle end to the telephoto end and is located closer to the object side at the telephoto end than at the wide angle end, the second lens unit moves during zooming from the wide angle end to the telephoto end and finally moves toward the image side, during zooming from the wide angle end to the telephoto end, the aperture stop first moves toward the object side, assumes a state in which it is located closest to the object side at an intermediate point in zooming from the wide angle end to the telephoto end, then reverses its moving direction in this state, and is located closer to the object side at the telephoto end than at the wide angle end, during zooming from the wide angle end to the telephoto end, the third lens unit first moves toward the object side, assumes a state in which it is located closest to the object side at an intermediate point in zooming from the wide angle end to the telephoto end, then reverses its moving direction in this state, and is located closer to the object side at the telephoto end than at the wide angle end, when an intermediate zoom state is defined as a state in which the third lens unit is located closest to the object side, the first lens unit is located closer to the object side in the intermediate zoom state than at the wide angle end, and the aperture stop is located closer to the object side in the intermediate zoom state than at the wide angle end, and the zoom lens satisfies the following conditional expression:

$$1.3 < f_3/|f_2| < 3.0$$

where $f_3$ is the focal length of the third lens unit, and $f_2$ is the focal length of the second lens unit.

According to another aspect of the present invention, there is provided an image pickup apparatus comprising a zoom lens as described above, and an image pickup element disposed on the image side of the zoom lens that converts an image formed by the zoom lens into an electrical signal.

BRIEF DESCRIPTION OF THE DRAWINGS

FIG. 4A shows aberrations at the wide angle end, and FIG. 4B shows aberrations in an intermediate focal length state;

FIG. 5C shows aberrations in the intermediate zoom state, and FIG. 5D shows aberrations at the telephoto end;

FIG. 6A shows aberrations at the wide angle end, and FIG. 6B shows aberrations in an intermediate focal length state;

FIG. 7C shows aberrations in the intermediate zoom state, and FIG. 7D shows aberrations at the telephoto end;

FIG. 8A shows aberrations at the wide angle end, and FIG. 8B shows aberrations in an intermediate focal length state;

FIG. 9C shows aberrations in the intermediate zoom state, and FIG. 9D shows aberrations at the telephoto end;

DETAILED DESCRIPTION OF THE INVENTION

Figure 1A:
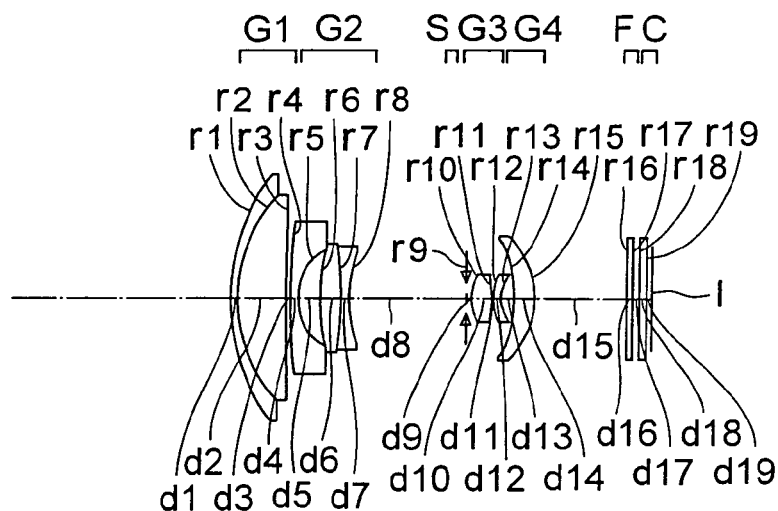
FIGS. 1A to 1D are cross sectional views of a zoom lens according to a first embodiment of the present invention in the state in which the zoom lens is focused on a object point at infinity respectively at the wide angle end (FIG. 1A), in a first intermediate focal length state (FIG. 1B), in an intermediate zoom state (FIG. 1C) ant at the telephoto end (FIG. 1D)
Figure 1B:
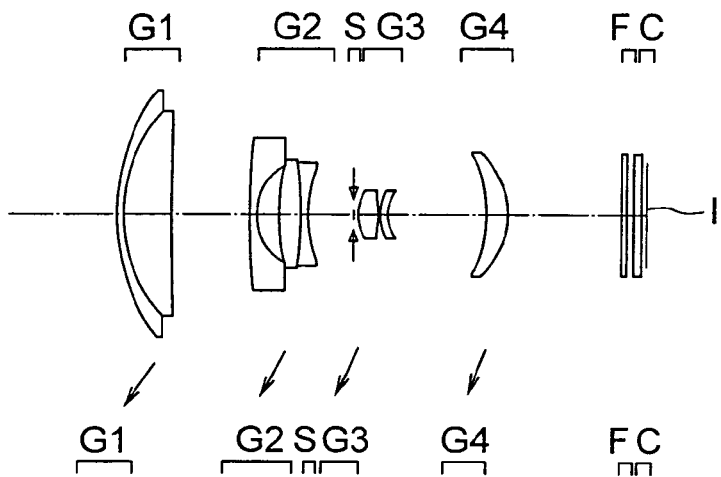
Figure 1C:
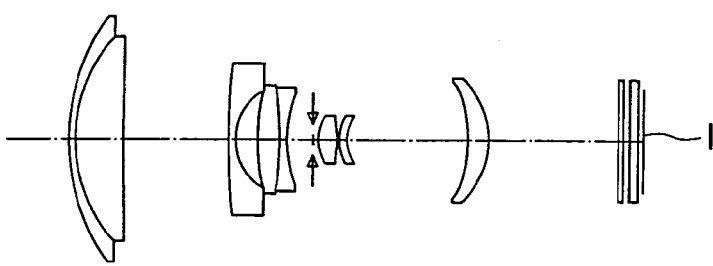
Figure 1D:
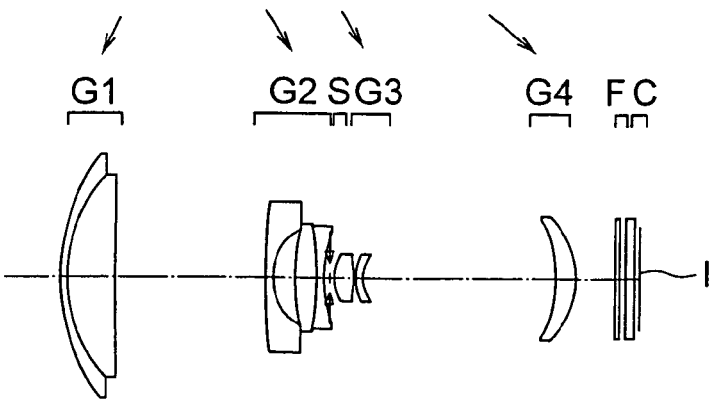
Figure 2A:
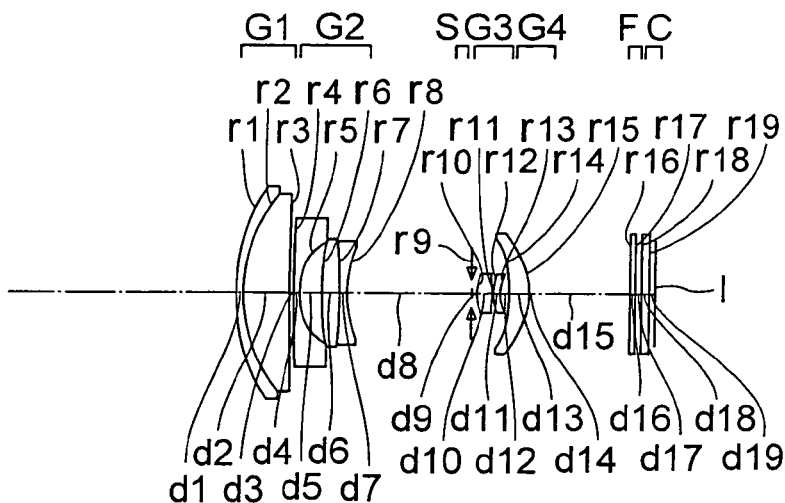
FIGS. 2A, 2B, 2C and 2D are cross sectional views similar to FIGS. 1A to 1D showing a zoom lens according to a second embodiment of the present invention.
Figure 2B:
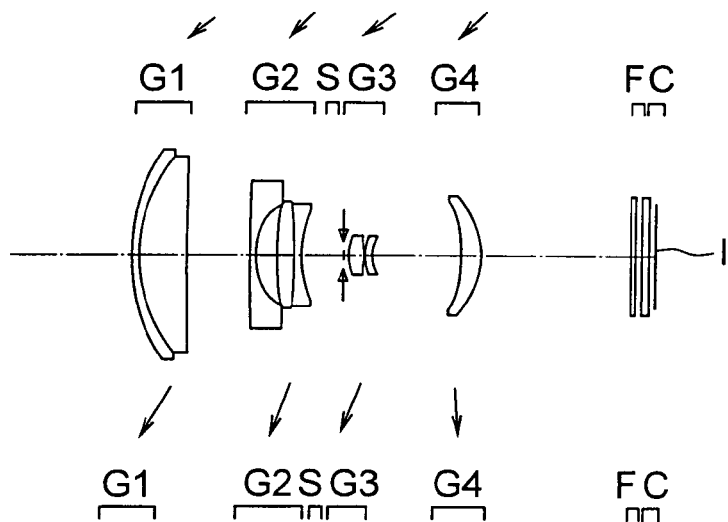
Figure 2C:
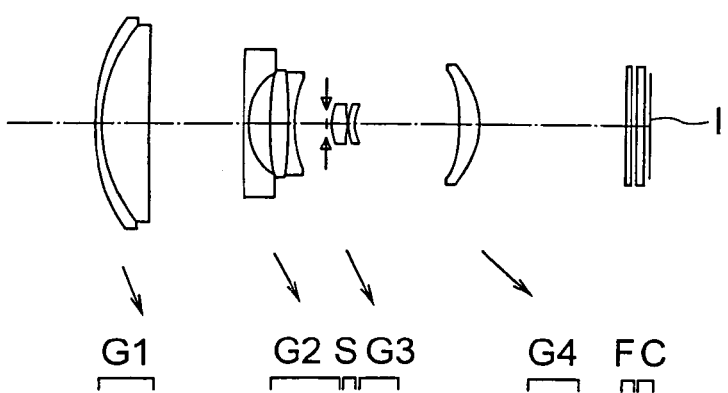
Figure 2D:
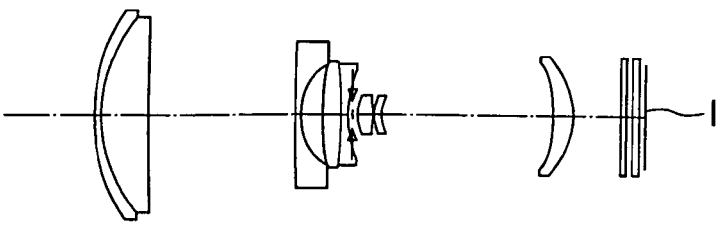
Figure 3A:
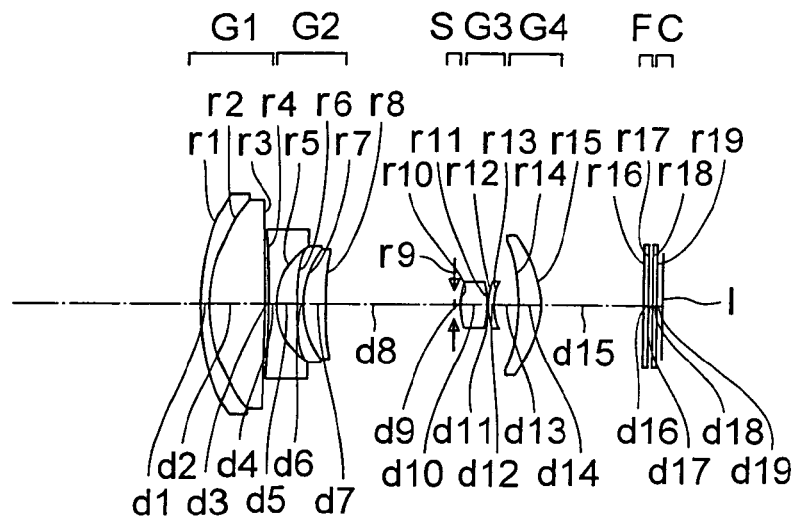
FIGS. 3A, 3B, 3C and 3D are cross sectional views similar to FIGS. 1A to 1D showing a zoom lens according to a third embodiment of the present invention.
Figure 3B:
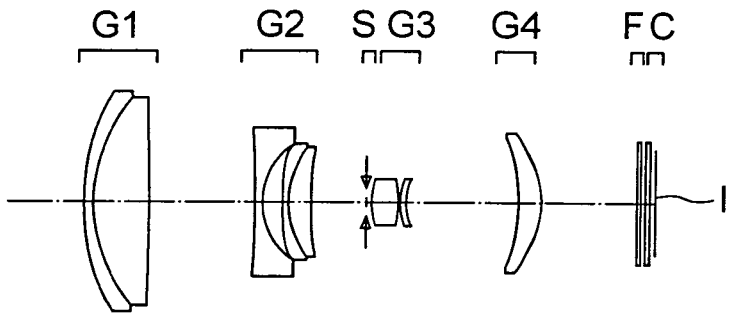
Figure 3C:
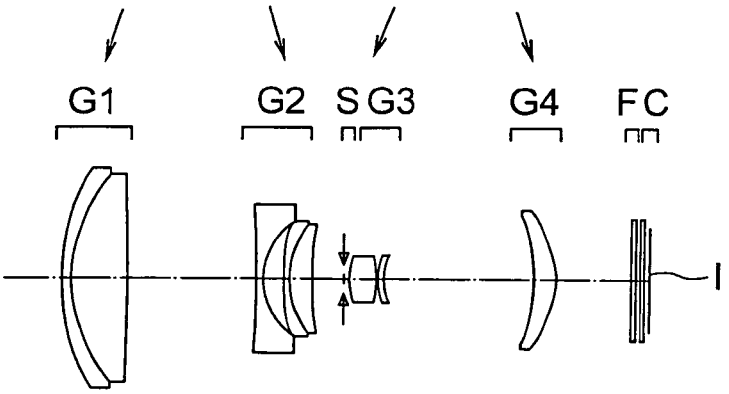
Figure 3D:
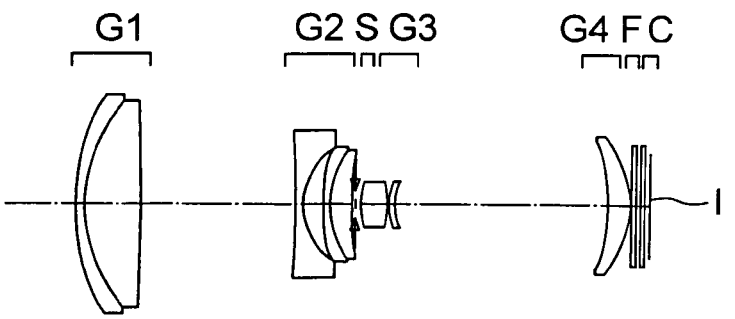
Figure 4A:
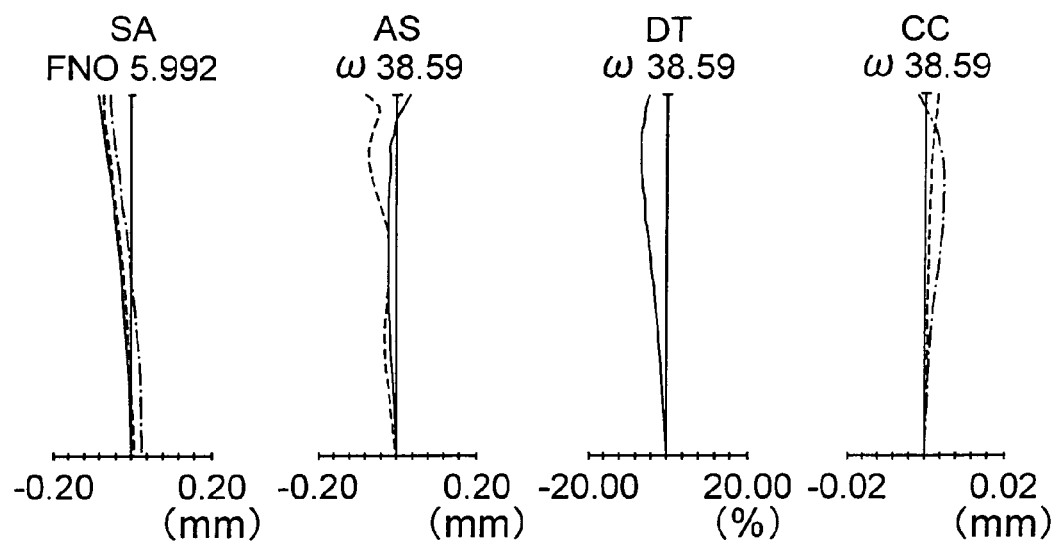
FIGS. 4A and 4B are diagrams showing spherical aberration, astigmatism, distortion and chromatic aberration of magnification in the first embodiment in the state in which the zoom lens is focused on an object point at infinity, where
Figure 4B:
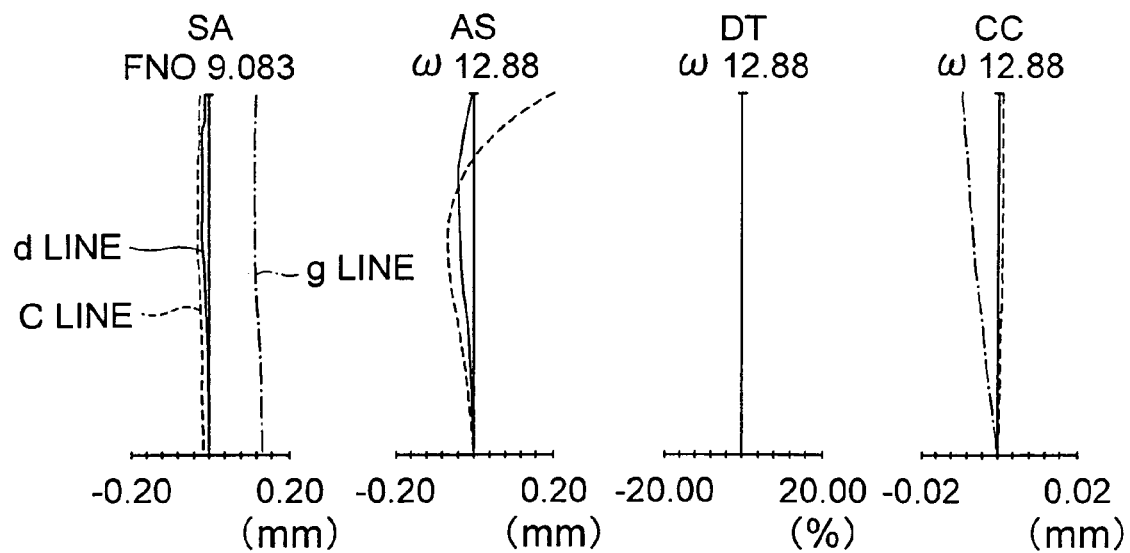
Figure 5C:
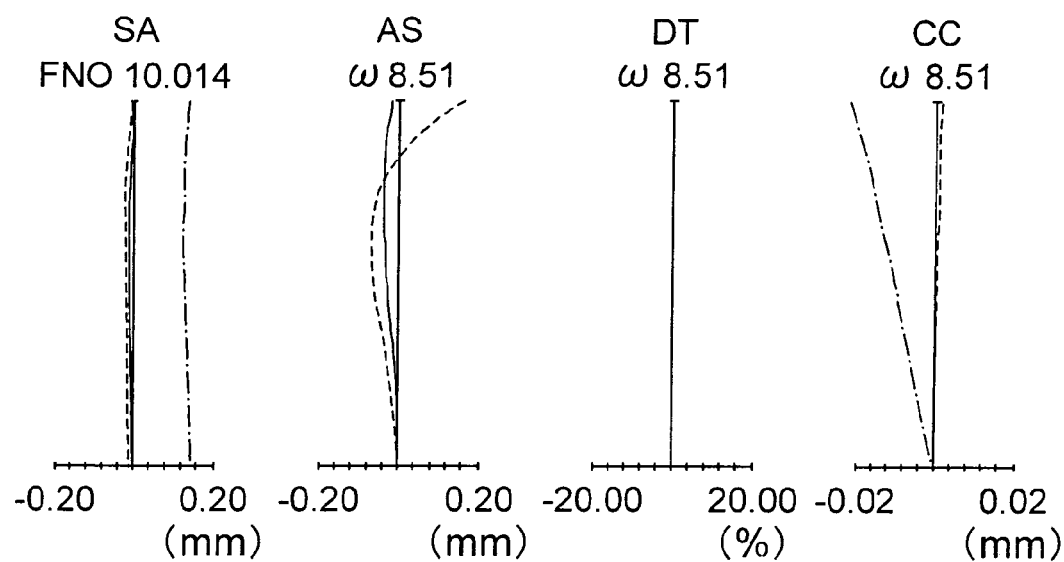
FIGS. 5C and 5D are diagrams showing spherical aberration, astigmatism, distortion and chromatic aberration of magnification in the first embodiment in the state in which the zoom lens is focused on an object point at infinity, where
Figure 5D:
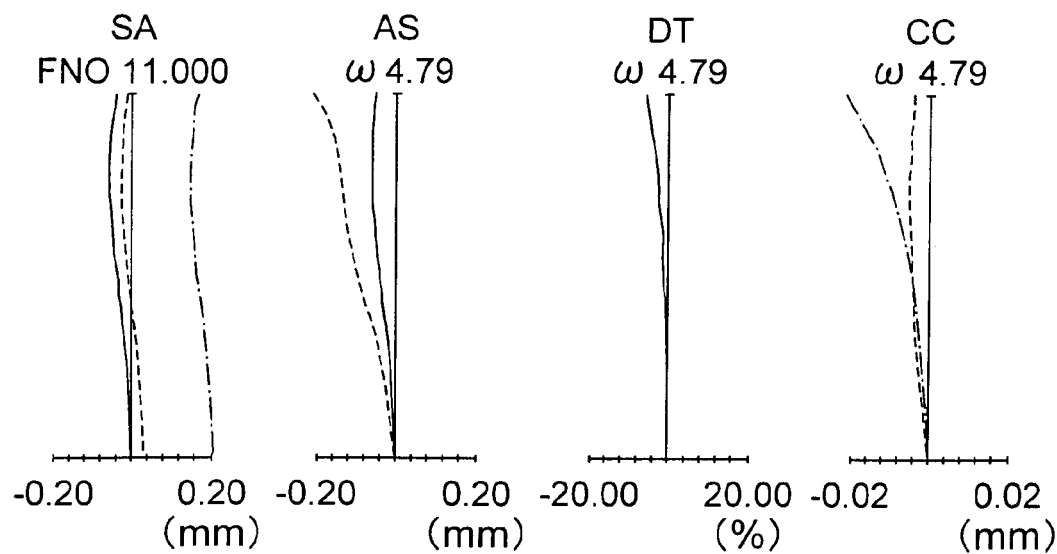
Figure 6A:
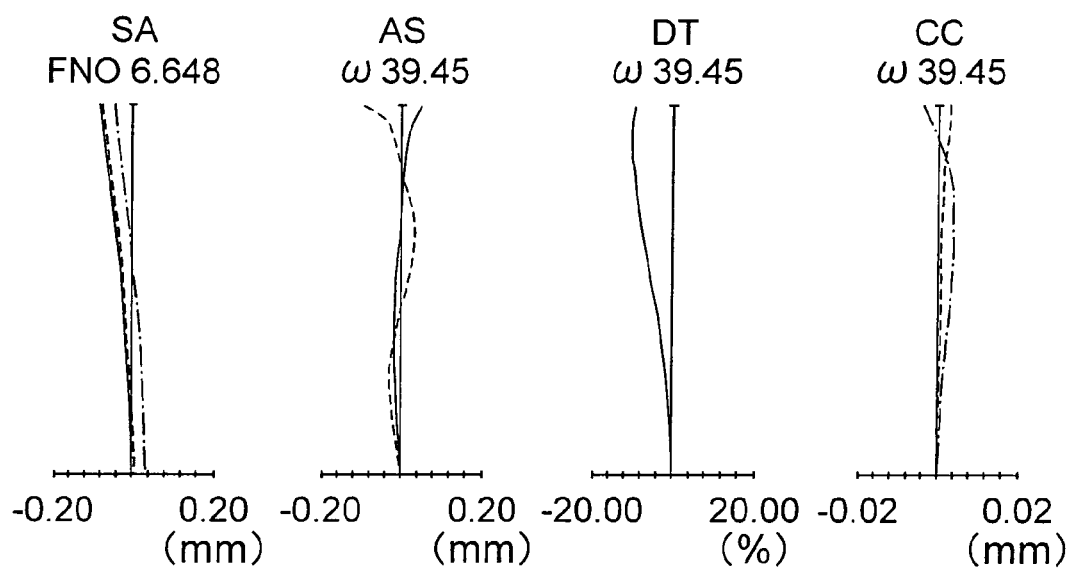
FIGS. 6A and 6B are diagrams showing spherical aberration, astigmatism, distortion and chromatic aberration of magnification in the second embodiment in the state in which the zoom lens is focused on an object point at infinity, where
Figure 6B:
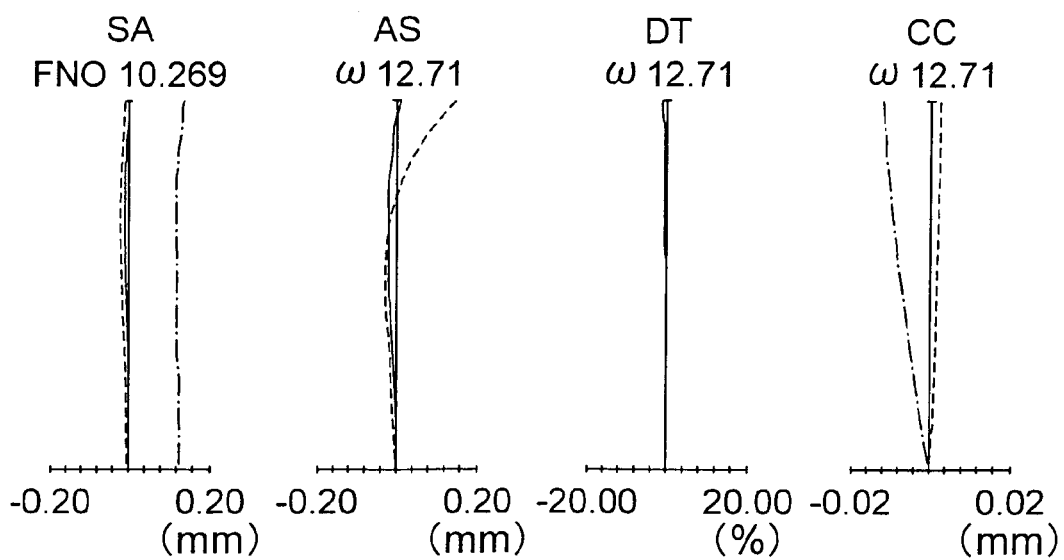
Figure 7C:
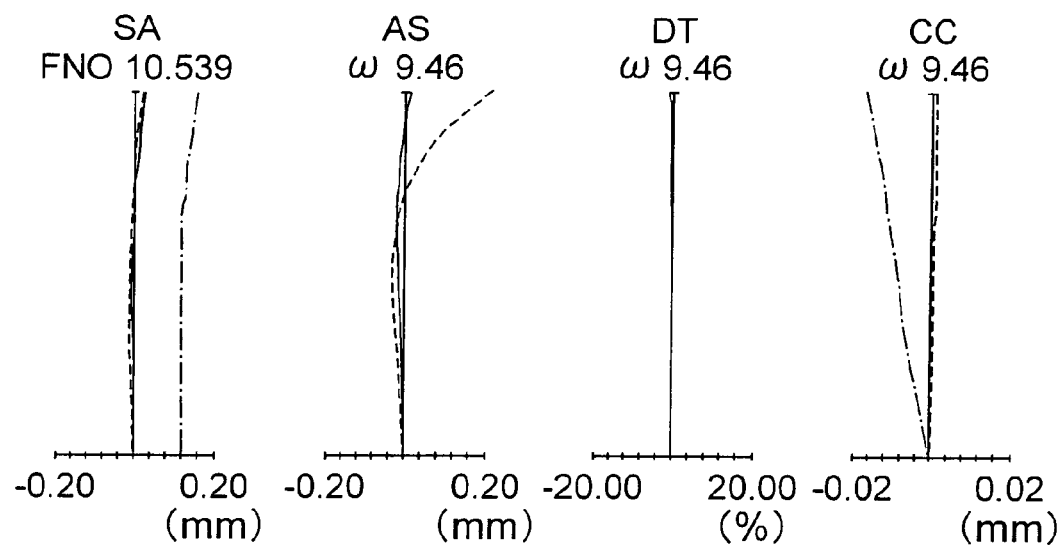
FIGS. 7C and 7D are diagrams showing spherical aberration, astigmatism, distortion and chromatic aberration of magnification in the second embodiment in the state in which the zoom lens is focused on an object point at infinity, where
Figure 7D:
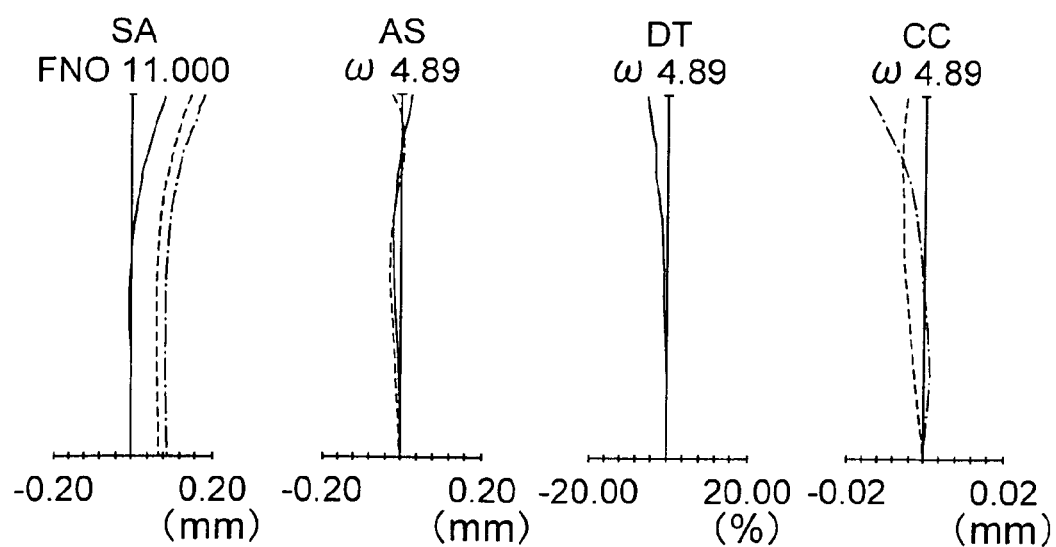
Figure 8A:
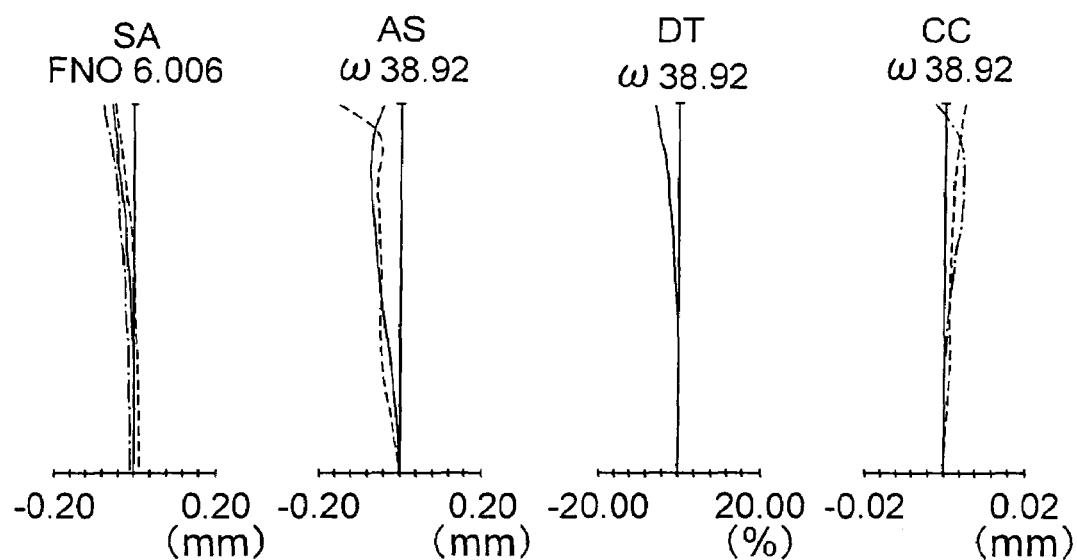
FIGS. 8A and 8B are diagrams showing spherical aberration, astigmatism, distortion and chromatic aberration of magnification in the third embodiment in the state in which the zoom lens is focused on an object point at infinity, where
Figure 8B:
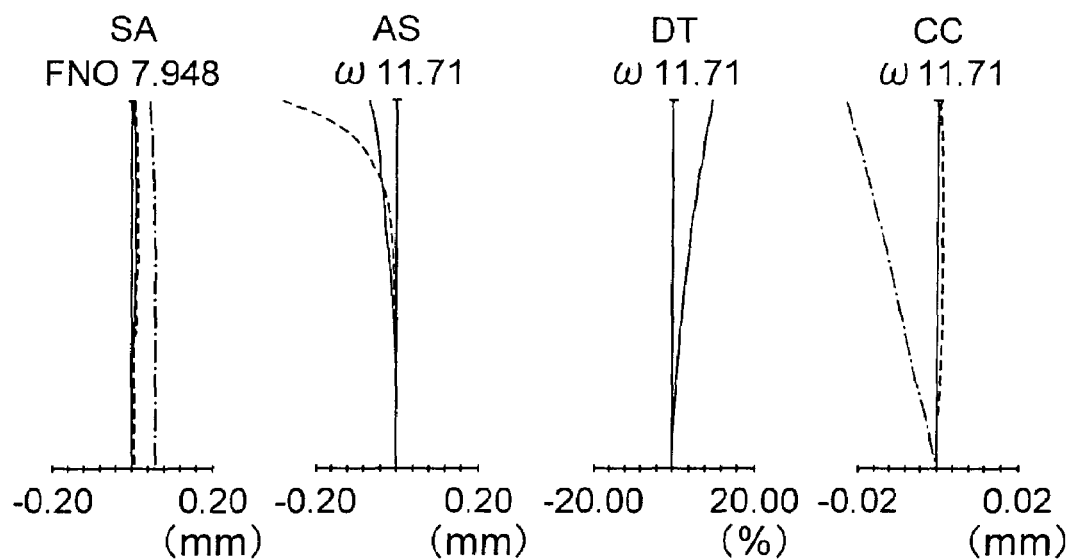

The zoom lens according to the present invention is composed, in order from the object side thereof, of:

a first lens unit having a positive refracting power;

a second lens unit having a negative refracting power; and a rear group having a positive refracting power and including at least one lens unit, wherein the lens unit located closest to the object side in the rear group is a third lens unit having a positive refracting power, an aperture stop is provided closer to the image side than the second lens unit and closer to the object side than the lens surface closest to the image side in the third lens unit, and during zooming from the wide angle end to the telephoto end in a state in which the zoom lens is focused on an object at the farthest distance, the distance between the first lens unit and the second lens unit is larger at the telephoto end than at the wide angle end, the distance between the second lens unit and the third lens unit is smaller at the telephoto end than at the wide angle end, the first lens unit moves during zooming from the wide angle end to the telephoto end and is located closer to the object side at the telephoto end than at the wide angle end, the second lens unit moves during zooming from the wide angle end to the telephoto end, wherein it finally moves toward the image side (i.e. the direction of movement of the second lens unit in the final stage of its movement is toward the image side), during zooming from the wide angle end to the telephoto end, the aperture stop first moves toward the object side, eventually assumes a state in which it is located closest to the object side (i.e. eventually comes to a position at which it is located closest to the object side) at an intermediate point in zooming from the wide angle end to the telephoto end, then reverses its moving direction in this state, and is located closer to the object side at the telephoto end than at the wide angle end, during zooming from the wide angle end to the telephoto end, the third lens unit first moves toward the object side, eventually assumes a state in which it is located closest to the object side (i.e. comes to a position at which it is located closest to the object side) at an intermediate point in zooming from the wide angle end to the telephoto end, then reverses its moving direction in this state, and is located closer to the object side at the telephoto end than at the wide angle end, and when an intermediate zoom state is defined as the state in which the third lens unit is located closest to the object side, the first lens unit is located closer to the object side in the intermediate zoom state than at the wide angle end, and the aperture stop is located closer to the object side in the intermediate zoom state than at the wide angle end.

In addition, the zoom lens satisfies the following conditional expression:

$$1.3 < f_3/|f_2| < 3.0 \qquad (1)$$

where $f_3$ is the focal length of the third lens unit, and $f_2$ is the focal length of the second lens unit.

Locating the first lens unit closer to the object side at the telephoto end than at the wide angle end is advantageous in providing an adequate magnification change by a change in the distance between the first lens unit and the second lens unit.

By locating the third lens unit closer to the object side at the telephoto end than at the wide angle end, the third lens unit is provided with a magnification changing function. This is advantageous in increasing the zoom ratio.

In this scheme of magnification change, the third lens unit is designed to provide a magnification change in a zoom range near the wide angle end by moving toward the object side when increasing the magnification in the zoom range near the wide angle end. The aperture stop is also moved toward the object side as with the third lens unit. This makes it possible to shift the position of the exit pupil away from the image plane. As a result, it becomes easy to provide an adequately large zoom range in which good telecentricity of the zoom lens is achieved. The aperture stop is located near the third lens unit, and the aperture stop is designed to have a locus of movement similar to or the same as that of the third lens unit. This also facilitates reduction of the size of the third lens unit.

In the intermediate zoom state in which the third lens unit is at the position closest to the object side among the positions the third lens unit assumes, the first lens unit is at a position closer to the object side than its position at the wide angle end. This enables the second lens unit and the third lens unit to share the function of providing the magnification change while achieving a reduction in the entire length and in the diametrical size at the wide angle end. This is also advantageous in reducing aberrations. Furthermore, the position of the aperture stop is made closer to the second lens unit. This facilitates an increase in the brightness.

In a zoom range near the telephoto end, in order to prevent the entire length of the zoom lens from becoming unduly large while ensuring an adequate magnification change provided by a change in the distance between the first lens unit and the second lens unit, the magnification is increased by moving the second lens unit toward the image side.

Simultaneously, the aperture stop and the third lens unit are moved toward the image side in a zoom range near the telephoto end. This is advantageous in providing a space for movement of the second lens unit toward the image side and in increasing the zoom ratio while preventing an increase in the entire length.

In addition, to provide an adequate amount of magnification change favorably by movement of the second lens unit toward the image side, the absolute value of the refracting power of the second unit is designed to be larger than that of the third lens unit.

In connection with this, it is preferred that the following conditional expression be satisfied:

$$1.3 < f_3/|f_2| < 3.0 \qquad (1)$$

where $f_3$ is the focal length of the third lens unit, and $f_2$ is the focal length of the second lens unit.

Conditional expression (1) specifies preferred ratios of refracting powers of the second lens unit and the third lens unit.

By designing the zoom lens in such a way that the lower limit of conditional expression (1) is not exceeded, the second lens unit can have an adequately high refracting power, which is advantageous in providing an adequate zoom ratio by movement of the second lens unit toward the image side in the zoom range near the telephoto end. Alternatively, the refracting power of the third lens unit can be made so low that spherical aberration etc. generated in the third lens unit is advantageously reduced.

By designing the zoom lens in such a way that the upper limit of conditional expression (1) is not exceeded, the third lens unit can have an adequately high refracting power, and the amount of magnification change provided by the second lens unit is prevented from becoming unduly large, which is advantageous in reducing variations in aberrations generated in the second lens unit.

In the above described zoom lens according to the present invention, it is more preferred that at least one of the following features be adopted.

It is preferred that the zoom lens satisfy the following conditional expression:

$$8.0 < f_t/f_w < 25.0 \qquad (2)$$

where $f_t$ is the focal length of the entire zoom lens system at the telephoto end, and $f_w$ is the focal length of the entire zoom lens system at the wide angle end.

Conditional expression (2) specifies preferred zoom ratios.

By achieving an adequately high zoom ratio not lower than the lower limit of conditional expression (2), the advantages of size reduction and high zoom ratio provided by the present invention can be enjoyed.

By making the zoom ratio not to be higher than the upper limit of conditional expression (2), the refractive powers of the respective lens units are prevented from becoming unduly high, and each lens unit is not required to have a large thickness for aberration correction. This is advantageous in reducing the size of the zoom lens at the time when the lens barrel is collapsed.

It is also preferred that during zooming from the wide angle end to the telephoto end, the first lens unit move first toward the object side. This is advantageous in reducing the entire length of the zoom lens at the wide angle end and in reducing the effective diameter of the first and the second lens units.

It is also preferred that the first lens unit move in such a way that the following conditional expression is satisfied:

$$0.55 < (T1_m - T1_w)/(T1_t - T1_w) < 1.3 \qquad (3)$$

where $T1_w$ is the actual distance on the optical axis from the lens surface located closest to the object side in the first lens unit to the image plane at the wide angle end, $T1_m$ is the actual distance on the optical axis from the lens surface located closest to the object side in the first lens unit to the image plane in the intermediate zoom state, and $T1_t$ is the actual distance on the optical axis from the lens surface located closest to the object side in the first lens unit to the image plane at the telephoto end.

Conditional expression (3) specifies preferred relationship between the movement amount of the first lens unit during zooming from the wide angle end to the intermediate zoom state and that during zooming from the wide angle end to the telephoto end.

By designing the zoom lens in such a way that the lower limit of conditional expression (3) is not exceeded, the first lens unit is prevented from coming unduly close to the image side in the zoom range near the intermediate zoom state. This is advantageous in reducing the movement amount of the third lens unit.

By designing the zoom lens in such a way that the upper limit of conditional expression (3) is not exceeded, the first lens unit is prevented from coming unduly close to the image side at the telephoto end. This is advantageous in achieving an adequately high zoom ratio and in reducing the entire length of the zoom lens during zooming.

Locating the second lens unit closer to the image side at the telephoto end than at the wide angle end is advantageous in providing an adequate magnification change by the second lens unit. In addition, this facilitates reduction of the movement amounts of the first and the third lens units. This is also advantageous in reducing the thickness (or the length along the optical axis) of the zoom lens in the state in which the lens barrel is collapsed.

Moving the second lens unit first toward the object side upon zooming from the wide angle end to the telephoto end is advantageous in enabling reduction in the entire length of the zoom lens at the wide angle end and in making the effective diameters of the first and the second lens units in the zoom range near the wide angle end smaller.

It is also preferred that the third lens unit move in such a way that the following conditional expression is satisfied:

$$1.0 < (T3_m - T3_w)/(T3_t - T3_w) < 1.5 \qquad (4)$$

where $T3_w$ is the distance on the optical axis from the lens surface located closest to the object side in the third lens unit to the image plane at the wide angle end, $T3_m$ is the distance on the optical axis from the lens surface located closest to the object side in the third lens unit to the image plane in the intermediate zoom state, and $T3_t$ is the distance on the optical axis from the lens surface located closest to the object side in the third lens unit to the image plane at the telephoto end.

Conditional expression (4) specifies preferred relationship between the movement amount of the third lens unit during zooming from the wide angle end to the intermediate zoom state and that during zooming from the wide angle end to the telephoto end.

By designing the zoom lens in such a way that the lower limit of conditional expression (4) is not exceeded, an adequate magnification increasing function of the second lens unit in a zoom range near the telephoto end can advantageously achieved.

By designing the zoom lens in such a way that the upper limit of conditional expression (4) is not exceeded, the third lens unit is prevented from coming unduly close to the image side at the telephoto end, the amount of magnification change provided by the second lens unit can be made smaller, and reduction of variations in aberrations is facilitated.

It is also preferred that the following conditional expression be satisfied:

$$0.3 < f_m/f_t < 0.9 \quad (5)$$

where $f_m$ is the focal length of the entire zoom lens system in the intermediate zoom state, and $f_t$ is the focal length of the entire zoom lens system at the telephoto end.

Conditional expression (5) specifies preferred magnification changing conditions in the state in which the third lens unit is located closest to the object side.

By designing the zoom lens in such a way that the lower limit of conditional expression (5) is not exceeded, the amount of magnification change provided by the second lens unit from becoming unduly large throughout the zoom range from the wide angle end to the telephoto end. This is advantageous in making variations in aberrations small.

By designing the zoom lens in such a way that the upper limit of conditional expression (5) is not exceeded, the amount of magnification change provided by the third lens unit from becoming unduly large throughout the zoom range. This is advantageous in making variations in aberrations small.

It is preferred that the first lens unit be composed of two or fewer lenses, namely at most two lenses, the third lens unit be composed of two or fewer lenses, namely at most two lenses, and each of the first, the second and the third lens units have at least one aspheric surface.

The first and the second lens units tend to have large movement amounts during zooming. Therefore, decreasing the number of lenses included in these lens units leads to a reduction in the load on a drive mechanism. In addition, decreasing the number of lenses is advantageous in reducing the size of the zoom lens in the state in which the lens barrel is collapsed.

On the other hand, decreasing the number of lenses included in each lens unit makes it difficult to achieve aberration correction. In view of this, an aspheric surface(s) is used in each of the first, the second and the third lens unit to facilitate aberration correction.

Furthermore it is preferred that the second lens unit be configured to include a plurality of negative lenses and at least one positive lens. Thus, the negative refracting power is distributed to the plurality of negative lenses, and aberrations are cancelled by the positive lens(es). This facilitates reduction of aberrations generated by the second lens unit, which tends to have a large refracting power.

It is also preferred that the rear group includes a fourth lens unit having a positive refracting power disposed on the image side of the third lens unit, and that the fourth lens unit move during zooming from the wide angle end to the telephoto end in such a way that the distance between the fourth lens unit and the third lens unit changes and be located closer to the image side at the telephoto end than at the wide angle end.

By these features, the fourth lens unit can be provided with a magnification increasing function. This is advantageous, consequently, in achieving an adequately large zoom ratio while preventing an increase in the entire length of the zoom lens.

Furthermore, it is preferred that during zooming from the wide angle end to the telephoto end the fourth lens unit first move toward the object side, and thereafter move toward the image side.

By this movement, the distance between the fourth lens unit and the third lens unit at the wide angle end can be prevented from becoming large, which facilitates reduction of variations in aberrations. In addition, since in a telephoto zoom range, the fourth lens unit moves toward the image side to increase magnification, the amount of magnification change provided by the second lens unit can be made smaller, which facilitates reduction of variations in aberrations.

It is preferred, from the viewpoint of correction of curvature of field, that the fourth lens unit be composed of one positive lens having an aspheric surface, the total number of lenses included in the fourth lens unit be one, and the absolute value of the paraxial curvature of the image side surface of this positive lens be larger than the absolute value of the paraxial curvature of its object side surface.

Furthermore, it is preferred that the above mentioned positive lens in the fourth lens unit be a positive meniscus lens having a convex surface directed toward the image side. By this feature, variations in the angle of incidence on the image pickup element with zooming can readily be made small, and a decrease in the light quantity in the peripheral region can readily be prevented.

It is also preferred that the zoom lens satisfies the following conditional expression:

$$0.6 < T1_t/f_t < 0.9 \quad (6)$$

where $T1_t$ is the actual distance on the optical axis from the lens surface closest to the object side in the first lens unit to the image plane at the telephoto end, and $f_t$ is the focal length of the entire zoom lens system at the telephoto end.

Conditional expression (6) specifies preferred entire lengths (actual distances) at the telephoto end.

By designing the zoom lens in such a way that the lower limit of conditional expression (6) is not exceeded, the refracting power of the second lens unit can readily be made small, which is advantageous in reducing aberrations.

Designing the zoom lens in such a way that the upper limit of conditional expression (6) is not exceeded to make the entire length (actual distance) of the zoom lens at the telephoto end small is advantageous in reducing the size of the zoom lens in the state in which the lens barrel is collapsed.

An image pickup apparatus according to the present invention comprises at least any one of the above described zoom lenses and an image pickup element disposed on the image side of the zoom lens that converts an image formed by the zoom lens into an electrical signal. Thus, an image pickup apparatus equipped with a small size zoom lens having a high zoom ratio can be provided.

Furthermore, it is preferred that the image pickup apparatus be provided with an image processing section that performs signal processing for correcting aberrations contained in the image represented by the electrical signal. This is advantageous in further reducing the size of the zoom lens, since aberrations of the zoom lens are allowed to be left.

In the case where the zoom lens has a focusing function, the conditional expressions presented above should be regarded as conditions in the state in which the zoom lens is focused on an object point at the farthest distance.

Focusing operation from an object at a long distance to an object at a short distance may be performed by advancing the first lens unit, advancing the entire zoom lens or moving the second and/or third lens unit. To reduce the load on driving for focusing, it is preferred that a fourth lens unit having a positive refracting power or a fourth lens unit having a negative refracting power be provided, and the focusing be performed by moving this fourth lens unit.

In conditional expression (1), it is more preferred that the lower limit value be 1.5, more preferably 1.6. It is more preferred that the upper value be 2.5, more preferably 2.0.

In conditional expression (2), it is more preferred that the lower limit value be 8.5, more preferably 9.0. It is more preferred that the upper value be 15.0, more preferably 10.0.

In conditional expression (3), it is more preferred that the lower limit value be 0.7, more preferably 0.85. It is more preferred that the upper value be 1.25, more preferably 1.2.

In conditional expression (4), it is more preferred that the lower limit value be 1.05, more preferably 1.1. It is more preferred that the upper value be 1.4, more preferably 1.35.

In conditional expression (5), it is more preferred that the lower limit value be 0.4, more preferably 0.45. It is more preferred that the upper value be 0.7, more preferably 0.6.

In conditional expression (6), it is more preferred that the lower limit value be 0.7, more preferably 0.8. It is more preferred that the upper value be 0.87.

In the above-described modes of the invention, it is more preferred that some of the conditions, which may be selected arbitrarily, be satisfied at the same time. In the more preferred numerical range limitations by each of the conditional expressions presented just above, limitation by only the upper limit value or the lower limit value may be applied. Furthermore, the various features described above may be adopted in any possible combination.

THE BEST MODE FOR CARRYING OUT THE INVENTION

In the following, embodiments of the zoom lens and the image pickup apparatus according to the present invention will be described in detail with reference to the drawings. It should be understood, however, that the present invention is not limited by the embodiments. The zoom lens according to each embodiment has a high zoom ratio, a small diametrical dimension and good optical performance.

In the following, first to third embodiments of the zoom lens according to the present invention will be described. FIGS. 1A to 1D, 2A to 2D and 3A to 3D are cross sectional views of the zoom lenses according to the first to third embodiments respectively at the wide angle end (FIGS. 1A, 2A and 3A), in an intermediate focal length state (FIGS. 1B, 2B and 3B), in the intermediate zoom state (FIGS. 1C, 2C and 3C) and at the telephoto end (FIGS. 1D, 2D and 3D) in the state in which the zoom lenses are focused on an object point at infinity. In FIGS. 1A to 1D, 2A to 2D and 3A to 3D, the first lens unit is denoted by G1, the second lens unit is denoted by G2, an aperture stop is denoted by S, the third lens unit is denoted by G3, the fourth lens unit is denoted by G4, a plane parallel plate having wavelength range restriction coating applied thereon that blocks or reduces infrared light to constitute a low pass filter is denoted by F, a plane parallel plate constituting a cover glass for an electronic image pickup element is denoted by C, and the image plane is denoted by I. The cover glass C may have multi-layer coating for wavelength range restriction applied on its surface. The cover glass C may be designed to have a function of a low pass filter.

Numerical data presented later and the cross sectional views of the zoom lenses of the respective embodiments in various zoom states are for the states at the wide angle end, in the intermediate focal length state, in the intermediate zoom state and at the telephoto end. In all of the first to the third embodiments, the focal lengths corresponding to the above mentioned zoom positions or zoom states increase in the mentioned order. Aberration diagrams that will be mentioned later are presented for four states, namely the state at the wide angle end, the intermediate focal length state, the intermediate zoom state and the state at the telephoto end.

In the zoom lenses according to the first to third embodiments described below, the effective image pickup area has a constant rectangular shape at all the zoom positions. All the numerical values associated with conditional expressions presented below for each embodiment are for the state in which the zoom lens is focused on an object at infinity. The value obtained by adding the back focus to the distance from the incidence surface to the exit surface of the lens and the back focus represented by an equivalent air distance will also be presented in the following tables. In addition, the cross sectional views and aberration diagrams are presented for the state at the wide angle end, the intermediate focal length state, the state in which the third lens unit is located closest to the image side (i.e. the intermediate zoom state) and the state at the telephoto end in zooming from the wide angle end to the telephoto end.

Focusing is performed by moving the fourth lens unit. Focusing operation from an object point at a long distance to an object point at a short distance is performed by moving the fourth lens unit toward the object side. As described above, the plane parallel plates include a low pass filter having an IR cut coating applied thereon and a cover glass for CCD.

In each embodiment, the aperture stop S moves integrally with the third lens unit G3. All the numerical data presented below are for the state in which the zoom lens is focused on an object at infinity. In the numerical data, dimensions are in mm (millimeters) and angles are in degrees. As described above, the zoom data will be presented for the wide angle end (WE), the intermediate focal length state (ST1), the intermediate zoom state (ST2) and the telephoto end (TE).

As shown in FIGS. 1A to 1D, the zoom lens according to the first embodiment has a first lens unit G1 having a positive refracting power, a second lens unit G2 having a negative refracting power, an aperture stop S, a third lens unit G3 having a positive refracting power and a fourth lens unit G4 having a positive refracting power, which are arranged in the mentioned order from the object side. The third lens unit G3 and the fourth lens unit G4 constitute a rear group.

During zooming from the wide angle end to the telephoto end in the state in which the zoom lens is focused on an object at the farthest distance, the distance between the first lens unit G1 and the second lens unit G2 is larger at the telephoto end than at the wide angle end, and the distance between the second lens unit G2 and the third lens unit G3 is smaller at the telephoto end than at the wide angle end.

The first lens unit G1 moves during zooming from the wide angle end to the telephoto end and is located closer to the object side at the telephoto end than at the wide angle end.

The second lens unit G2 moves during zooming from the wide angle end to the telephoto end, wherein it finally moves toward the image side.

During zooming from the wide angle end to the telephoto end, the aperture stop S moves first toward the object side, eventually assumes a state in which it is located closest to the object side at an intermediate point in zooming from the wide angle end to the telephoto end, then reverses its moving direction in this state, and is located closer to the object side at the telephoto end than at the wide angle end.

During zooming from the wide angle end to the telephoto end, the third lens unit G3 moves first toward the object side, eventually assumes a state in which it is located closest to the object side at an intermediate point in zooming from the wide angle end to the telephoto end, then reverses its moving direction in this state, and is located closer to the object side at the telephoto end than at the wide angle end.

Here, an intermediate zoom state is defined as the state in which the third lens unit G3 is located closest to the object side. The first lens unit G1 is located closer to the object side in the intermediate zoom state than at the wide angle end, and the aperture stop S is located closer to the object side in the intermediate zoom state than at the wide angle end.

During zooming from the wide angle end to the telephoto end, the fourth lens unit G4 moves in such a way that the distance between the fourth lens unit G4 and the third lens unit G3 changes and is located closer to the image side at the telephoto end than at the wide angle end.

The first lens unit G1 is composed of a cemented lens composed, in order from the object side, of a negative meniscus lens having a convex surface directed toward the object side and a positive meniscus lens having a convex surface directed toward the object side. The second lens unit G2 is composed, in order from the object side, of a biconcave negative lens, and a cemented lens composed of a biconvex positive lens and a biconcave negative lens. The third lens unit G3 is composed, in order from the object side, of a biconvex positive lens and a negative meniscus lens having a convex surface directed toward the object side. The fourth lens unit G4 is composed of a positive meniscus lens having a convex surface directed toward the image side.

Aspheric surfaces are used in the image side surface of the positive meniscus lens having a convex surface directed toward the object side, both surfaces of the biconcave negative lens in the second lens unit G2, the image side surface of the biconcave negative lens located closest to the image side in the second lens unit G2, both surfaces of the biconvex positive lens in the third lens unit G3, the image side surface of the negative meniscus lens having a convex surface directed toward the object side in the third lens unit G3, and the image side surface of the positive meniscus lens having a convex surface directed toward the image side in the fourth lens unit G4, namely there are eight aspheric surfaces.

As shown in FIGS. 2A to 2D, the zoom lens according to the second embodiment has a first lens unit G1 having a positive refracting power, a second lens unit G2 having a negative refracting power, an aperture stop S, a third lens unit G3 having a positive refracting power and a fourth lens unit G4 having a positive refracting power, which are arranged in the mentioned order from the object side. The third lens unit G3 and the fourth lens unit G4 constitute a rear group.

During zooming from the wide angle end to the telephoto end in the state in which the zoom lens is focused on an object at the farthest distance, the distance between the first lens unit G1 and the second lens unit G2 is larger at the telephoto end than at the wide angle end, and the distance between the second lens unit G2 and the third lens unit G3 is smaller at the telephoto end than at the wide angle end.

The first lens unit G1 moves during zooming from the wide angle end to the telephoto end and is located closer to the object side at the telephoto end than at the wide angle end.

The second lens unit G2 moves during zooming from the wide angle end to the telephoto end, wherein it finally moves toward the image side.

During zooming from the wide angle end to the telephoto end, the aperture stop S moves first toward the object side, eventually assumes a state in which it is located closest to the object side at an intermediate point in zooming from the wide angle end to the telephoto end, then reverses its moving direction in this state, and is located closer to the object side at the telephoto end than at the wide angle end.

During zooming from the wide angle end to the telephoto end, the third lens unit G3 moves first toward the object side, eventually assumes a state in which it is located closest to the object side at an intermediate point in zooming from the wide angle end to the telephoto end, then reverses its moving direction in this state, and is located closer to the object side at the telephoto end than at the wide angle end.

Here, an intermediate zoom state is defined as the state in which the third lens unit G3 is located closest to the object side. The first lens unit G1 is located closer to the object side in the intermediate zoom state than at the wide angle end, and the aperture stop S is located closer to the object side in the intermediate zoom state than at the wide angle end.

During zooming from the wide angle end to the telephoto end, the fourth lens unit G4 moves in such a way that the distance between the fourth lens unit G4 and the third lens unit G3 changes and is located closer to the image side at the telephoto end than at the wide angle end.

The first lens unit G1 is composed of a cemented lens composed, in order from the object side, of a negative meniscus lens having a convex surface directed toward the object side and a positive meniscus lens having a convex surface directed toward the object side. The second lens unit G2 is composed, in order from the object side, of a biconcave negative lens, and a cemented lens composed of a biconvex positive lens and a biconcave negative lens. The third lens unit G3 is composed, in order from the object side, of a biconvex positive lens and a negative meniscus lens having a convex surface directed toward the object side. The fourth lens unit G4 is composed of a positive meniscus lens having a convex surface directed toward the image side.

Aspheric surfaces are used in the image side surface of the positive meniscus lens having a convex surface directed toward the object side, both surfaces of the biconcave negative lens in the second lens unit G2, the image side surface of the biconcave negative lens located closest to the image side in the second lens unit G2, both surfaces of the biconvex positive lens in the third lens unit G3, the image side surface of the negative meniscus lens having a convex surface directed toward the object side in the third lens unit G3, and the image side surface of the positive meniscus lens having a convex surface directed toward the image side in the fourth lens unit G4, namely there are eight aspheric surfaces.

As shown in FIGS. 3A to 3D, the zoom lens according to the third embodiment has a first lens unit G1 having a positive refracting power, a second lens unit G2 having a negative refracting power, an aperture stop S, a third lens unit G3 having a positive refracting power and a fourth lens unit G4 having a positive refracting power, which are arranged in the mentioned order from the object side. The third lens unit G3 and the fourth lens unit G4 constitute a rear group.

During zooming from the wide angle end to the telephoto end in the state in which the zoom lens is focused on an object at the farthest distance, the distance between the first lens unit G1 and the second lens unit G2 is larger at the telephoto end than at the wide angle end, and the distance between the second lens unit G2 and the third lens unit G3 is smaller at the telephoto end than at the wide angle end.

The first lens unit G1 moves during zooming from the wide angle end to the telephoto end and is located closer to the object side at the telephoto end than at the wide angle end.

The second lens unit G2 moves during zooming from the wide angle end to the telephoto end, wherein it finally moves toward the image side.

During zooming from the wide angle end to the telephoto end, the aperture stop S moves first toward the object side, eventually assumes a state in which it is located closest to the object side at an intermediate point in zooming from the wide angle end to the telephoto end, then reverses its moving direction in this state, and is located closer to the object side at the telephoto end than at the wide angle end.

During zooming from the wide angle end to the telephoto end, the third lens unit G3 moves first toward the object side, eventually assumes a state in which it is located closest to the object side at an intermediate point in zooming from the wide angle end to the telephoto end, then reverses its moving direction in this state, and is located closer to the object side at the telephoto end than at the wide angle end.

Here, an intermediate zoom state is defined as the state in which the third lens unit G3 is located closest to the object side. The first lens unit G1 is located closer to the object side in the intermediate zoom state than at the wide angle end, and the aperture stop S is located closer to the object side in the intermediate zoom state than at the wide angle end.

During zooming from the wide angle end to the telephoto end, the fourth lens unit G4 moves in such a way that the distance between the fourth lens unit G4 and the third lens unit G3 changes and is located closer to the image side at the telephoto end than at the wide angle end.

The first lens unit G1 is composed, in order from the object side, of a cemented lens composed of a negative meniscus lens having a convex surface directed toward the object side and a positive meniscus lens having a convex surface directed toward the object side. The second lens unit G2 is composed, in order from the object side, of a biconcave negative lens, and a cemented lens composed of a negative meniscus lens having a convex surface directed toward the object side and a positive meniscus lens having a convex surface directed toward the object side. The third lens unit G3 is composed in order from the object side, of a biconvex positive lens and a negative meniscus lens having a convex surface directed toward the object side. The fourth lens unit G4 is composed of a positive meniscus lens having a convex surface directed toward the image side.

Aspheric surfaces are used in the image side surface of a positive meniscus lens having a convex surface directed toward the object side in the first lens unit G1, both surfaces of a biconcave negative lens in the second lens unit G2, the object side surface of a negative meniscus lens having a convex surface directed toward the object side in the second lens unit G2, both surfaces of a biconvex positive lens in the third lens unit G3, and both surfaces of a positive meniscus lens having a convex surface directed toward the image side in the fourth lens unit G4, namely there are eight aspheric surfaces.

When the zoom lens according to each embodiment is used, distortion may be corrected electrically.

In the zoom lenses according to the embodiments, barrel distortion appears on the rectangular photoelectric conversion surface, at the wide angle end. Whereas, the characteristic of distortion changes at the telephoto end and zoom positions near the intermediate focal length state.

To correct the distortion electrically, the effective image pickup area may be varied. For example, the effective image pickup area may be designed to have a barrel shape at the wide angle end and a rectangular shape in intermediate focal length states and at the telephoto end.

In cases where this feature is to be adopted in the image pickup apparatuses according to the embodiments, the effective image pickup area, which has been set in advance, may preferably be transformed into rectangular image information with reduced distortion by image transformation using image processing. The maximum image height $IH_w$ at the wide angle end may be designed, preferably, to be smaller than the maximum image height $IH_s$ in the intermediate focal length state and the maximum image height $IH_t$ at the telephoto end.

For example, the effective image pickup area may be designed in such a way that the effective image pickup area at the wide angle end has a dimension with respect to the shorter side direction equal to the dimension of the photoelectric conversion surface with respect to the shorter side direction, and a distortion of approximately −3% remains after image processing. As a matter of course, a barrel shaped area smaller than that described above may be set as the effective image pickup area, and image resulting from transformation of this area into a rectangular area may be recorded/reproduced.

Numerical data of each embodiment described above is shown below. Apart from symbols described above, f denotes a focal length of the entire zoom lens system, $F_{NO}$ denotes an F number, ω denotes a half image angle, WE denotes a wide angle end, ST denotes an intermediate state, TE denotes a telephoto end, each of r1, r2, ... denotes radius of curvature of each lens surface, each of d1, d2, ... denotes a distance between two lenses, each of nd1, nd2, ... denotes a refractive index of each lens for a d-line, and each of νd1, νd2, ... denotes an Abbe's number for each lens.

The overall length of the lens system which will be described later is a length which is obtained by adding the back focus to a distance from the first lens surface up to the last lens surface. BF (back focus) is a unit which is expressed upon air conversion of a distance from the last lens surface up to a paraxial image plane.

When x is let to be an optical axis with a direction of traveling of light as a positive (direction), and y is let to be in a direction orthogonal to the optical axis, a shape of the aspheric surface is described by the following expression.

$$x=(y^2/r)/[1+\{1-(K+1)(y/r)^2\}^{1/2}]+A_4y^4+A_6y^6+A_8y^8+A_{10}y^{10}+A_{12}y^{12}$$

where, r denotes a paraxial radius of curvature, K denotes a conical coefficient, A4, A6, A8, A10, and $A_{12}$ denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

EXAMPLE 1

| Unit mm | | | | |
|---|---|---|---|---|
| Surface data | | | | |
| Surface no. | r | d | nd | νd |
| 1 | 15.349 | 0.50 | 1.94595 | 17.98 |
| 2 | 11.357 | 3.50 | 1.77250 | 49.60 |
| 3* | 363.846 | Variable | | |
| 4* | −8871.915 | 0.50 | 1.83481 | 42.71 |
| 5* | 5.391 | 1.65 | | |
| 6 | 16.952 | 1.50 | 1.94595 | 17.98 |
| 7 | −20.046 | 0.50 | 1.77250 | 49.60 |
| 8* | 7.090 | Variable | | |
| 9 (S) | ∞ | 0.30 | | |
| 10* | 2.885 | 1.50 | 1.49700 | 81.54 |
| 11* | −16.218 | 0.10 | | |
| 12 | 3.814 | 0.50 | 2.00170 | 20.64 |
| 13* | 2.544 | Variable | | |
| 14 | −9.459 | 1.50 | 1.74320 | 49.34 |
| 15* | −6.453 | Variable | | |
| 16 | ∞ | 0.40 | 1.54771 | 62.84 |
| 17 | ∞ | 0.50 | | |
| 18 | ∞ | 0.50 | 1.51633 | 64.14 |
| 19 | ∞ | 0.37 | | |
| Image plane (Light receiving surface) | ∞ | | | |

-continued

Unit mm

Aspherical surface data

3rd surface k = 0.000, A4 = 1.59428e−05, A6 = 9.09943e−08
4th surface k = 0.000, A4 = 9.06376e−04, A6 = −3.82527e−05, A8 = 7.08506e−07,
A10 = −4.78046e−09
5th surface k = 0.000, A4 = 2.02837e−03, A6 = 8.05374e−05, A8 = −8.42827e−08,
A10 = −6.53433e−09
8th surface k = 0.000, A4 = −2.12944e−03, A6 = −1.32698e−05, A8 = 1.19902e−06,
A10 = −5.66577e−09
10th surface k = 0.000, A4 = −1.49814e−03, A6 = −1.54456e−04,
A8 = −4.31939e−06, A10 = −6.98110e−08
11th surface k = 0.000, A4 = 4.41037e−03, A6 = −2.49679e−07, A8 = 3.44841e−06,
A10 = −2.95705e−08
13th surface k = 0.000, A4 = 7.23212e−04, A6 = 3.44135e−04
15th surface k = 0.000, A4 = 3.00000e−05

Focal length of each lens unit

| f1 = 22.35 | f2 = −4.55 | f3 = 7.58 | f4 = 22.41 |
|---|---|---|---|

Zoom data

|  | WE | ST1 | ST2 | TE |
|---|---|---|---|---|
| IH | 3.88 | 3.88 | 3.88 | 3.88 |
| f (mm) | 5.10 | 16.99 | 26.01 | 49.09 |
| Fno. | 5.99 | 9.08 | 10.01 | 11.00 |
| 2ω (°) | 77.20 | 25.74 | 17.03 | 9.57 |
| BF | 8.33 | 9.86 | 11.09 | 4.42 |
| lens total length | 30.24 | 38.30 | 41.68 | 42.06 |
| d3 | 0.30 | 5.71 | 7.71 | 10.91 |
| d8 | 8.57 | 3.45 | 1.99 | 0.49 |
| d13 | 1.00 | 7.24 | 8.85 | 14.19 |
| d15 | 6.87 | 8.40 | 9.63 | 2.96 |

EXAMPLE 2

Unit mm

Surface data

| Surface no. | r | d | nd | vd |
|---|---|---|---|---|
| 1 | 14.588 | 0.40 | 1.94595 | 17.98 |
| 2 | 11.065 | 3.50 | 1.77250 | 49.60 |
| 3* | 217.453 | Variable |  |  |
| 4* | −64.965 | 0.40 | 1.83481 | 42.71 |
| 5* | 6.264 | 1.52 |  |  |
| 6 | 16.179 | 1.40 | 2.11764 | 16.79 |
| 7 | −32.931 | 0.40 | 1.83481 | 42.71 |
| 8* | 6.538 | Variable |  |  |
| 9 (S) | ∞ | 0.30 |  |  |
| 10* | 2.820 | 1.20 | 1.49700 | 81.54 |
| 11* | −28.531 | 0.10 |  |  |
| 12 | 3.539 | 0.40 | 2.00170 | 20.64 |
| 13* | 2.472 | Variable |  |  |

-continued

Unit mm

| 14 | −9.573 | 1.40 | 1.77250 | 49.60 |
|---|---|---|---|---|
| 15* | −6.332 | Variable |  |  |
| 16 | ∞ | 0.40 | 1.54771 | 62.84 |
| 17 | ∞ | 0.50 |  |  |
| 18 | ∞ | 0.50 | 1.51633 | 64.14 |
| 19 | ∞ | 0.37 |  |  |
| Image plane (Light receiving surface) | ∞ |  |  |  |

Aspherical surface data

3rd surface k = 0.000, A4 = 2.06323e−05, A6 = 6.50107e−08
4th surface k = 0.000, A4 = 1.10959e−03, A6 = −3.98151e−05, A8 = 7.08345e−07,
A10 = −4.95015e−09
5th surface k = 0.000, A4 = 2.10330e−03, A6 = 8.27618e−05, A8 = −1.28187e−07,
A10 = −4.93739e−09
8th surface k = 0.000, A4 = −1.87704e−03, A6 = −1.17134e−05, A8 = 1.17530e−06,
A10 = −5.48632e−09
10th surface k = 0.000, A4 = −8.00000e−04, A6 = −1.41957e−04,
A8 = −4.29901e−06, A10 = −6.98073e−08
11th surface k = 0.000, A4 = 4.49180e−03, A6 = 6.86008e−07, A8 = 3.45136e−06,
A10 = −2.94729e−08
13th surface k = 0.000, A4 = 7.51152e−04, A6 = 3.77400e−04
15th surface k = 0.000, A4 = 3.00000e−05

Focal length of each lens unit

| f1 = 21.61 | f2 = −4.67 | f3 = 8.12 | f4 = 20.27 |
|---|---|---|---|

Zoom data

|  | WE | ST1 | ST2 | TE |
|---|---|---|---|---|
| IH | 3.8 | 3.8 | 3.8 | 3.8 |
| f (mm) | 5.10 | 16.99 | 23.00 | 47.14 |
| Fno. | 6.65 | 10.27 | 10.54 | 11.00 |
| 2ω (°) | 78.93 | 25.42 | 18.92 | 9.77 |
| BF | 8.89 | 12.38 | 12.14 | 4.99 |
| lens total length | 29.96 | 37.65 | 39.92 | 39.74 |
| d3 | 0.30 | 4.68 | 6.82 | 10.75 |
| d8 | 9.05 | 3.13 | 2.34 | 0.40 |
| d13 | 0.70 | 6.46 | 7.61 | 12.59 |
| d15 | 7.44 | 10.92 | 10.68 | 3.53 |

EXAMPLE 3

Unit mm

Surface data

| Surface no. | r | d | nd | vd |
|---|---|---|---|---|
| 1 | 16.468 | 0.60 | 1.94595 | 17.98 |
| 2 | 11.669 | 4.00 | 1.77250 | 49.60 |

-continued

Unit mm

| | | | | |
|---|---|---|---|---|
| 3* | −298.514 | Variable | | |
| 4* | −35.694 | 0.50 | 1.83481 | 42.71 |
| 5* | 5.250 | 1.50 | | |
| 6* | 41.185 | 0.50 | 1.77250 | 49.60 |
| 7 | 6.700 | 1.60 | 1.94595 | 17.98 |
| 8 | 21.527 | Variable | | |
| 9 (S) | ∞ | 0.30 | | |
| 10* | 4.099 | 2.05 | 1.49700 | 81.54 |
| 11* | −10.634 | 0.10 | | |
| 12 | 4.996 | 0.40 | 2.00170 | 20.64 |
| 13 | 3.471 | Variable | | |
| 14* | −10.082 | 1.60 | 1.74320 | 49.34 |
| 15* | −5.932 | Variable | | |
| 16 | ∞ | 0.30 | 1.54771 | 62.84 |
| 17 | ∞ | 0.30 | | |
| 18 | ∞ | 0.30 | 1.51633 | 64.14 |
| 19 | ∞ | 0.37 | | |
| Image plane (Light receiving surface) | ∞ | | | |

Aspherical surface data

3rd surface k = 0.000, A4 = 2.79166e−05, A6 = −9.61223e−08

4th surface k = 0.000, A4 = 6.02597e−04, A6 = −3.67937e−05, A8 = 9.10591e−07, A10 = −7.79624e−09

5th surface k = 0.000, A4 = 6.24667e−04, A6 = 6.02647e−05, A8 = −2.20783e−06, A10 = −1.71665e−08

6th surface k = 0.000, A4 = 9.33860e−04, A6 = 3.93633e−05

10th surface k = 0.000, A4 = −2.44420e−03, A6 = −1.76979e−05, A8 = −3.79600e−06, A10 = −7.36605e−08

11th surface k = 0.000, A4 = 1.98650e−04, A6 = −4.57669e−05, A8 = 2.54073e−06, A10 = −2.62988e−08

14th surface k = 0.000, A4 = 1.16049e−03, A6 = −2.06578e−05

15th surface k = 0.000, A4 = 1.54681e−03, A6 = −7.33550e−07

Focal length of each lens unit

| f1 = 22.14 | f2 = −5.32 | f3 = 9.37 | f4 = 16.56 |
|---|---|---|---|

Zoom data

| | WE | ST1 | ST2 | TE |
|---|---|---|---|---|
| IH | 3.88 | 3.88 | 3.88 | 3.88 |
| f (mm) | 5.10 | 17.01 | 25.99 | 48.56 |
| Fno. | 6.01 | 7.95 | 8.76 | 11.00 |
| 2ω (°) | 77.92 | 23.43 | 15.73 | 9.39 |
| BF | 8.49 | 7.95 | 6.92 | 1.13 |
| lens total length | 32.91 | 40.69 | 42.36 | 41.14 |
| d3 | 0.30 | 7.51 | 9.29 | 11.21 |
| d8 | 9.19 | 3.97 | 2.26 | 0.30 |
| d13 | 1.77 | 8.11 | 10.74 | 15.36 |
| d15 | 7.43 | 6.88 | 5.85 | 0.07 |

Figure 9C:
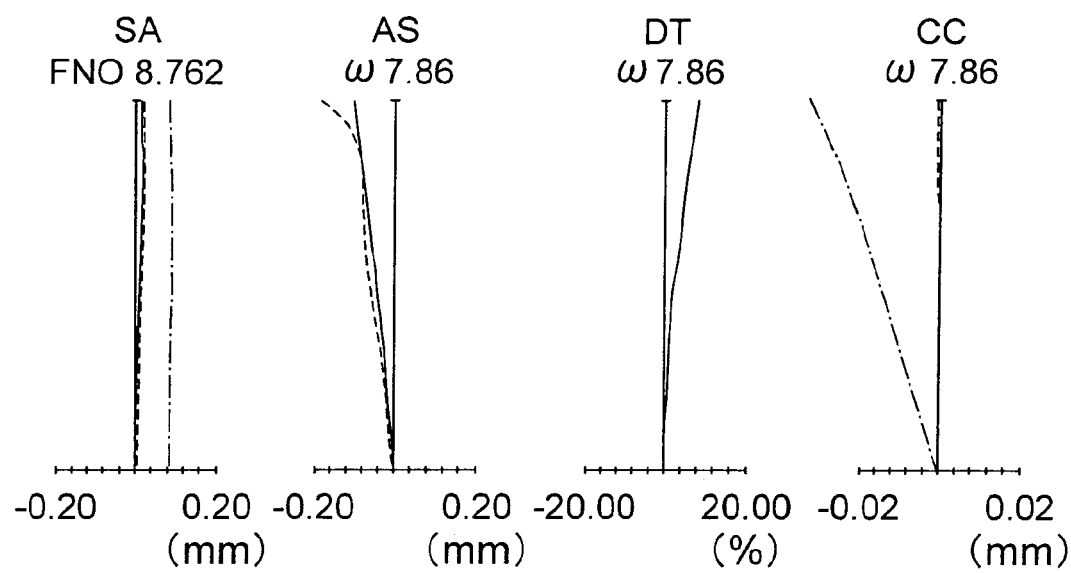
FIGS. 9C and 9D are diagrams showing spherical aberration, astigmatism, distortion and chromatic aberration of magnification in the third embodiment in the state in which the zoom lens is focused on an object point at infinity, where
Figure 9D:
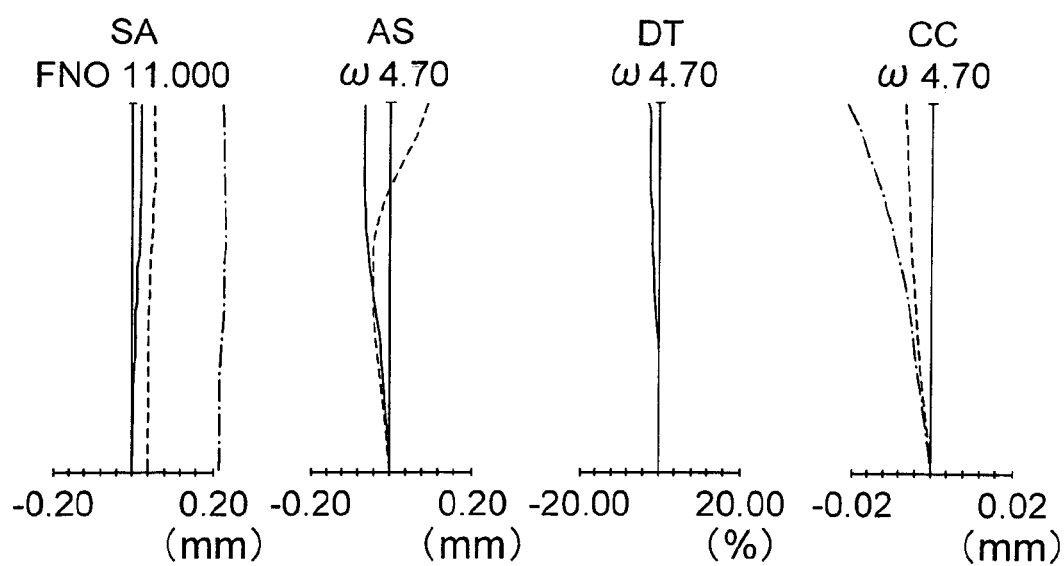

FIGS. 4A through 9D are aberration diagrams of the zoom lenses according to the first to the third embodiments in the state in which the zoom lenses are focused on an object point at infinity. These aberration diagrams show spherical aberration (SA), astigmatism (AS), distortion (DT) and chromatic aberration of magnification (CC) at the wide angle end (FIGS. 4A, 6A and 8A), in the intermediate focal length state (FIGS. 4B, 6B and 8B), in the intermediate zoom state (FIGS. 5C, 7C and 9C) and at the telephoto end (FIGS. 5D, 7D and 9D). In these diagrams, the sign "ω" represents half the angle of field.

Presented below are Numerical values including values associated with the conditional expressions for the respective embodiments, where STND refers to the intermediate focal length state and M1 refers to the intermediate zoom state.

| | Example 1 | Example 2 | Example 3 |
|---|---|---|---|
| lens total length WIDE | 30.24 | 29.96 | 32.91 |
| lens total length STND | 38.30 | 37.65 | 40.69 |
| lens total length M1 | 41.68 | 39.92 | 42.36 |
| lens total length TELE | 42.06 | 39.74 | 41.14 |
| BF WIDE | 8.33 | 8.89 | 8.49 |
| BF STND | 9.86 | 12.38 | 7.95 |
| BF M1 | 11.09 | 12.14 | 6.92 |
| BF TELE | 4.42 | 4.99 | 1.13 |
| T1w | 30.51 | 30.23 | 33.09 |
| T1m | 42.00 | 40.26 | 42.59 |
| T1t | 42.36 | 40.10 | 41.41 |
| T3w | 13.19 | 12.97 | 10.57 |
| T3m | 23.87 | 23.19 | 22.04 |
| T3t | 22.51 | 21.03 | 20.90 |
| fm | 26.01 | 23 | 25.99 |
| $(1) f_3/|f_2|$ | 1.66 | 1.74 | 1.76 |
| $(2) f_t/f_w$ | 9.62 | 9.24 | 9.51 |
| $(3)(T1_m - T1_w)/(T1_t - T1_w)$ | 0.97 | 1.02 | 1.14 |
| $(4)(T3_m - T3_w)/(T3_t - T3_w)$ | 1.15 | 1.27 | 1.11 |
| $(5) f_m/f_t$ | 0.53 | 0.49 | 0.54 |
| $(6) T1_t/f_t$ | 0.86 | 0.85 | 0.85 |

(Correction of Distortion)

Incidentally, when the zoom lens system of the present invention is used, a digital correction of distortion of an image is carried out electrically. A basic concept for the digital correction of the distortion of an image will be described below.

Figure 10:
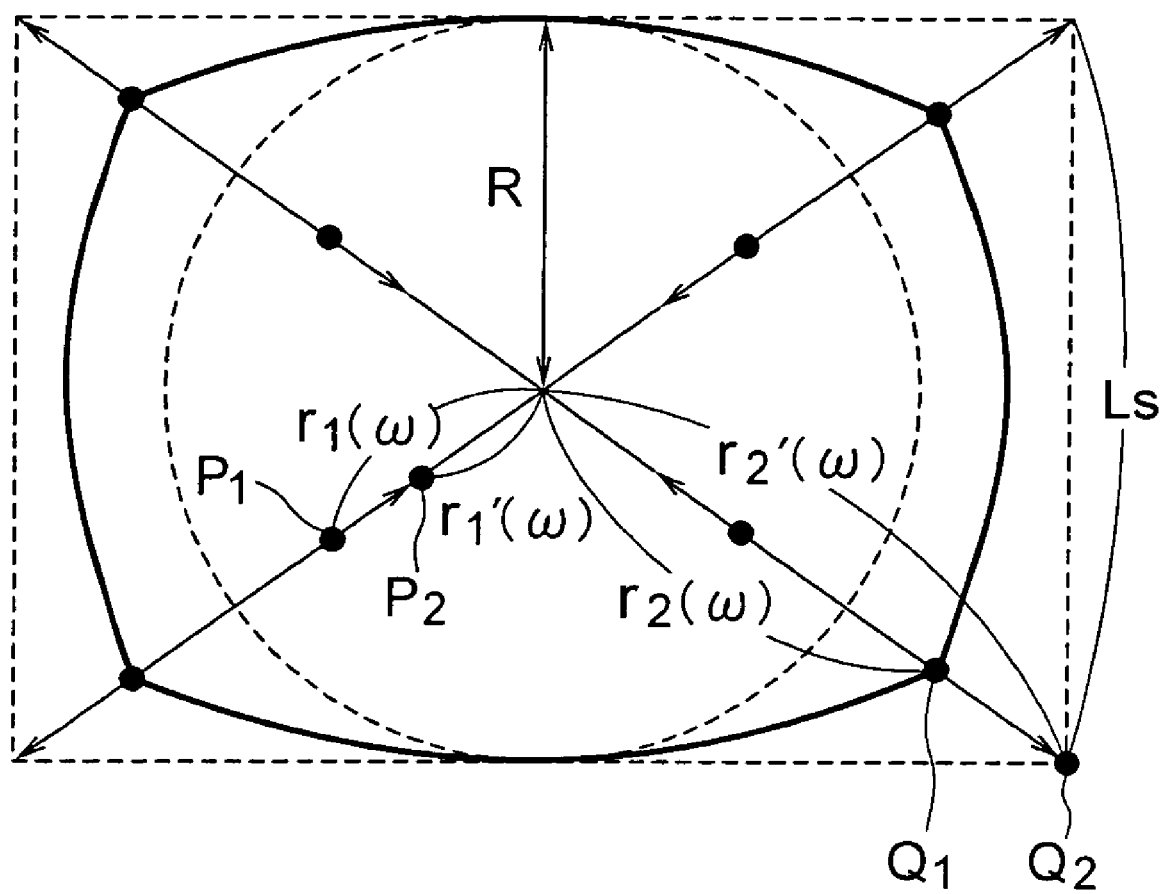
FIG. 10 is a diagram illustrating correction of distortion.

For example, as shown in FIG. 10, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius r(ω) other than the radius R is moved in a substantial direction of radiation, and the correction is carried out by moving on a concentric circle such that the radius becomes r'(ω).

For example, in FIG. 10, a point $P_1$ on a circumference of an arbitrary radius $r_1(\omega)$ positioned at an inner side of a circle of radius R is moved to a point $P_2$ on a circumference of a radius $r_1'(\omega)$ which is to be corrected, directed toward a center of the circle. Moreover, a point $Q_1$ on a circumference of an arbitrary radius $r_2(\omega)$ positioned at an outer side of the circle of radius R is moved to a point $Q_2$ on a circumference of a radius $r_2'(\omega)$ which is to be corrected, directed toward a direction away from the center of the circle.

Here, r'(ω) can be expressed as follows.

$$r'(\omega) = \alpha \cdot f \cdot \tan \omega \, (0 \leq \alpha \leq 1)$$

where, ω is a half image angle of an object and f is a focal length of an imaging optical system (the zoom lens system in the present invention).

Here, when an ideal image height corresponding to a circle (image height) of radius R is let to be Y, then $$\alpha = R/Y = R/(f \cdot \tan \omega).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius $r(\omega)$ other than the radius R in a substantial direction of radiation, and moving on a concentric circle such that the radius becomes $r'(\omega)$, it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount $r'(\omega) - r(\omega)$, an arrangement may be made such that a relationship between $r(\omega)$, in other words, half image angle and the image height, or a relationship between a real image height r and an ideal image height $r'/\alpha$ is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0 \leq R \leq 0.6 \, Ls$$

where, Ls is a length of a short side of the effective image pickup surface.

It is preferable that the radius R satisfies the following conditional expression.

$$0.3 \, Ls \leq R \leq 0.6 \, Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $$r'(\omega) = \alpha \cdot f \cdot \tan \omega$$

near a telephoto end in the focal point zones which are divided.

However, in this case, at a wide angle end in the focal point zones which are divided, a barrel-shape distortion at the wide angel end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $$r'(\omega) = \alpha \cdot f \cdot \tan \omega$$

near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $$f = y/\tan \omega$$

holds.

Here, y denotes a height (image height) of an image point from the optical axis, f denotes a focal length of an imaging system (zoom lens system in the present invention), and $\omega$ denotes an angle (object half image angle) with respect to the optical axis in an object point direction corresponding to image points connecting from a center on an image pickup plane up to a position of y.

When there is a barrel-shape distortion in the imaging system, the relationship becomes $$f > y/\tan \omega.$$

In other words, when the focal length f of the imaging system, and the image height y are let to be fixed, a value of $\omega$ becomes large.

(Digital Camera)

Figure 11:
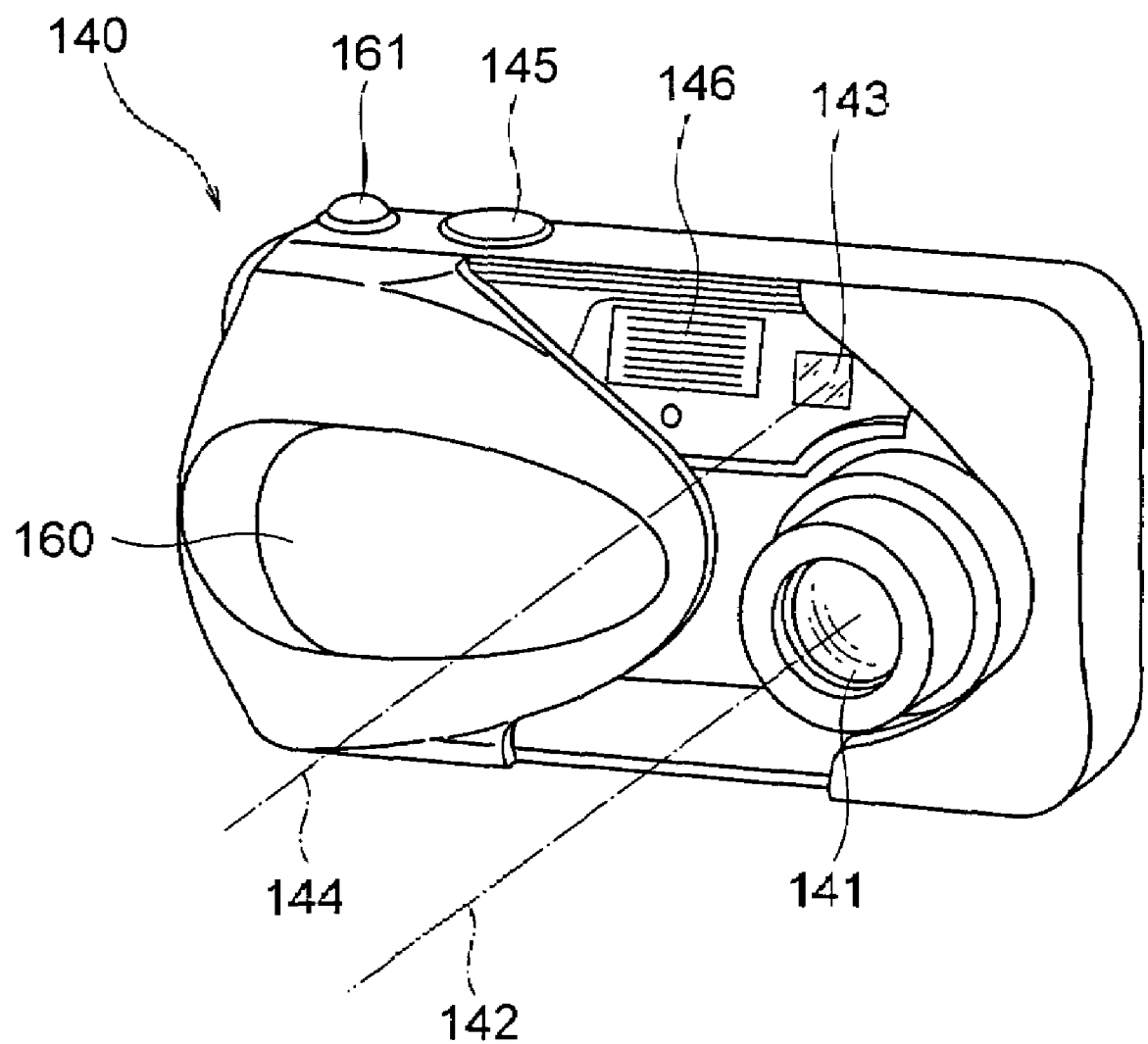
FIG. 11 is a front perspective view showing an outer appearance of a digital camera equipped with a zoom lens according to the present invention.
Figure 12:
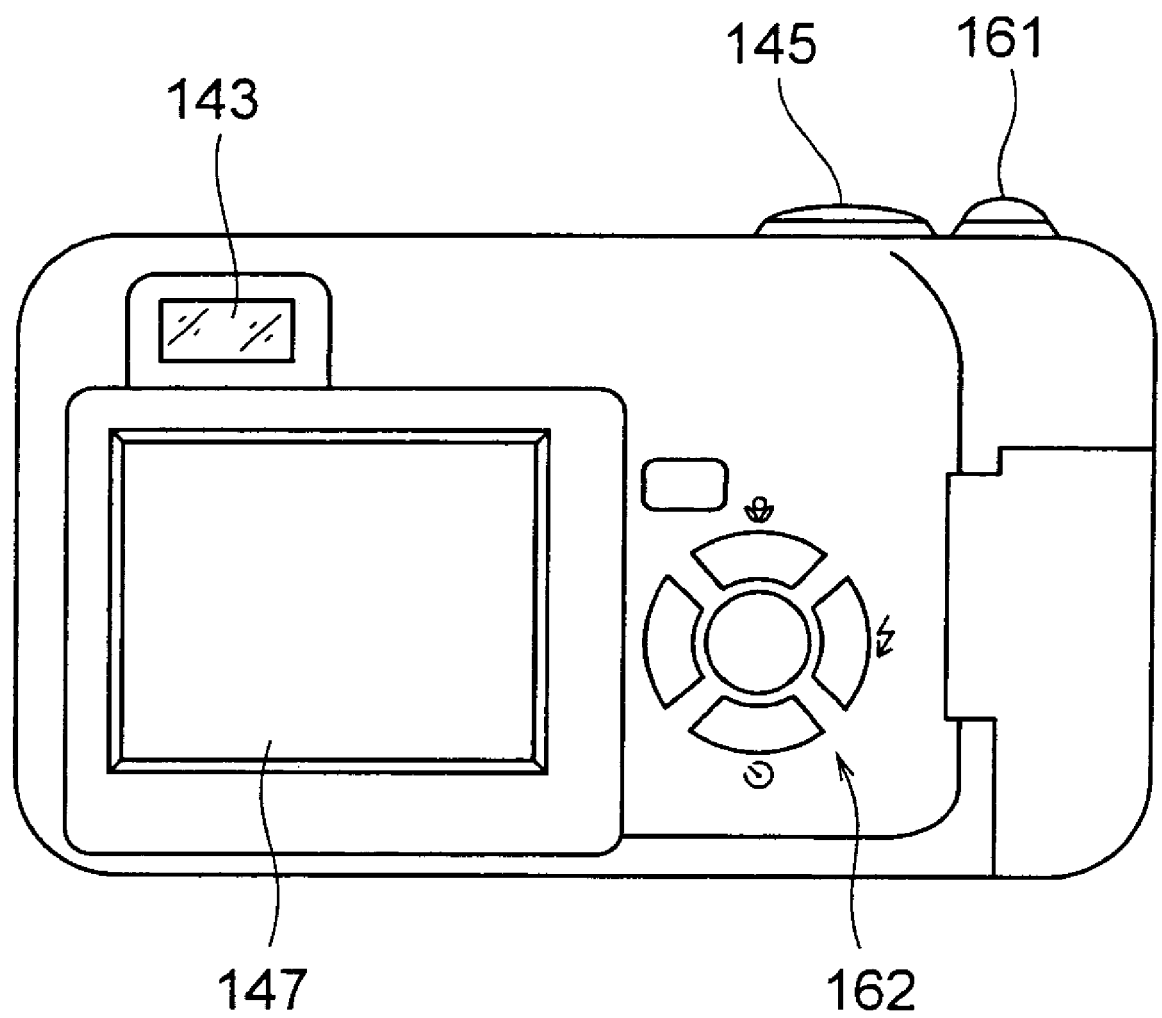
FIG. 12 is a rear perspective view of the digital camera.
Figure 13:
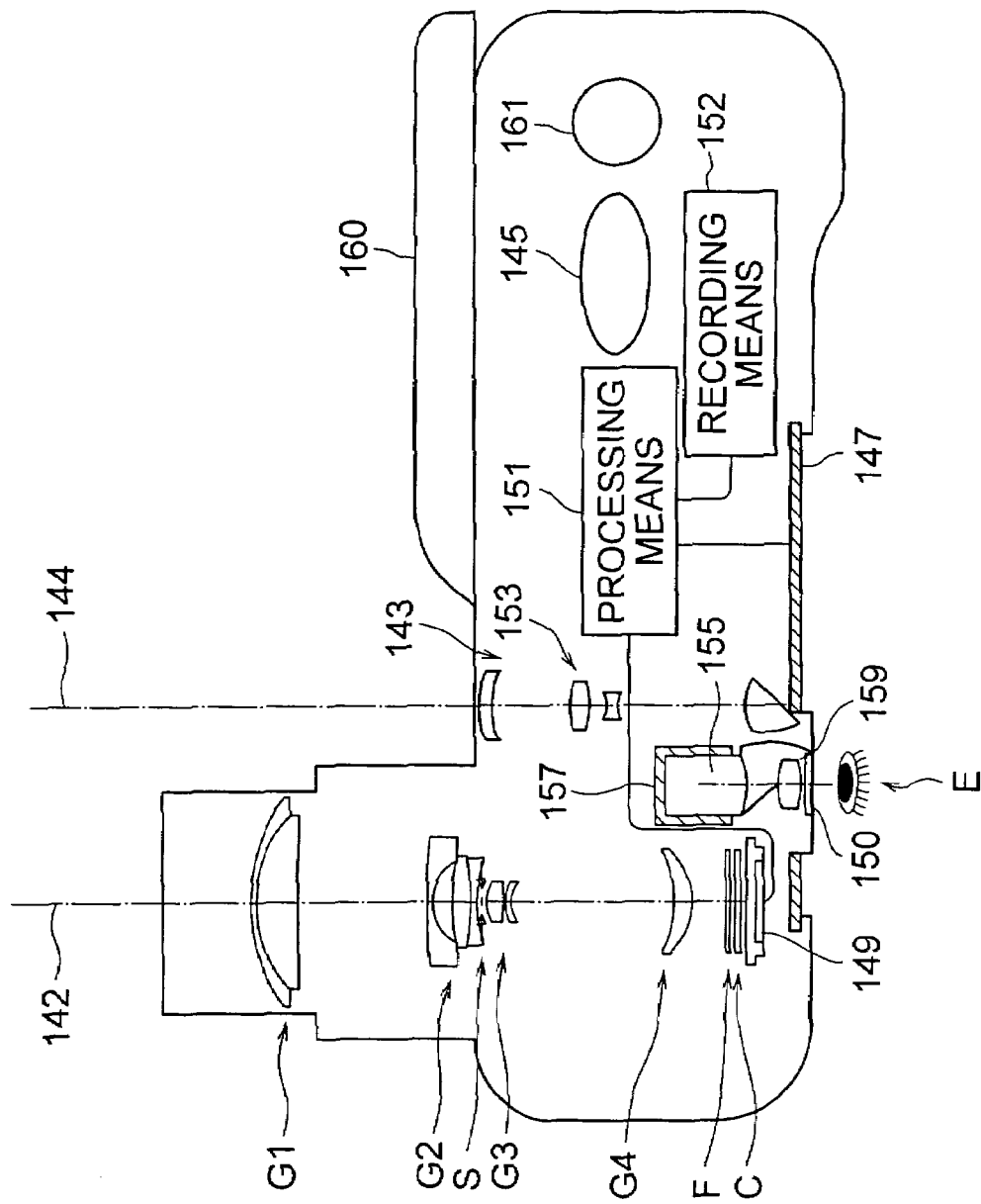
FIG. 13 is a cross sectional view of the digital camera.

FIG. 11 to FIG. 13 are conceptual diagrams of a structure of a digital camera according to the present invention in which a zoom lens system described above is incorporated in a taking optical system 141. FIG. 11 is a front perspective view showing an appearance of a digital camera 140, FIG. 12 is a rear perspective view of the same, and FIG. 13 is a schematic cross-sectional view showing a structure of the digital camera 140. In FIG. 11 and FIG. 13, show an uncollapsed state of the taking optical system 141. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., and in the uncollapsed state of the taking optical system 141, by sliding a cover 160, the taking optical system 141, the finder optical system 143, and the flash 146 are covered by the cover 160. Further, when the cover 160 is opened and the digital camera is set in a photo taking state, the taking optical system 141 assumes the uncollapsed state as shown in FIG. 13, when the shutter button 145 disposed on an upper portion of the digital camera 140 is pressed, in synchronization with the pressing of the shutter button 145, a photograph is taken by the taking optical system 141 such as the zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver-salt film is disposed instead of the CCD 149.

Furthermore, a finder objective optical system 153 is disposed on the finder optical path 144. The finder objective optical system 153 consists of a plurality of lens units (three units in the diagram), and two prisms, and is made of a zoom optical system in which a focal length changes in synchronization with a zoom lens system of the taking optical system 141. An object image formed by the finder objective optical system 153 is formed on a field frame 157 of an erecting prism 155 which is an image erecting member. On a rear side of the erecting prism 155, an eyepiece optical system 159 which guides an erected image to a viewer's eyeball, is disposed. A cover member 150 is disposed on an emergence side of the eyepiece optical system 159.

Since the digital camera 140 structured in such manner has the taking optical system 141 according to the present invention, has an extremely small thickness in collapsed state, and an extremely stable imaging performance in the entire zooming region at high magnification, it is possible to realize a high-performance, a small size, and a widening of angle.

(Internal Circuit Structure)

Figure 14:
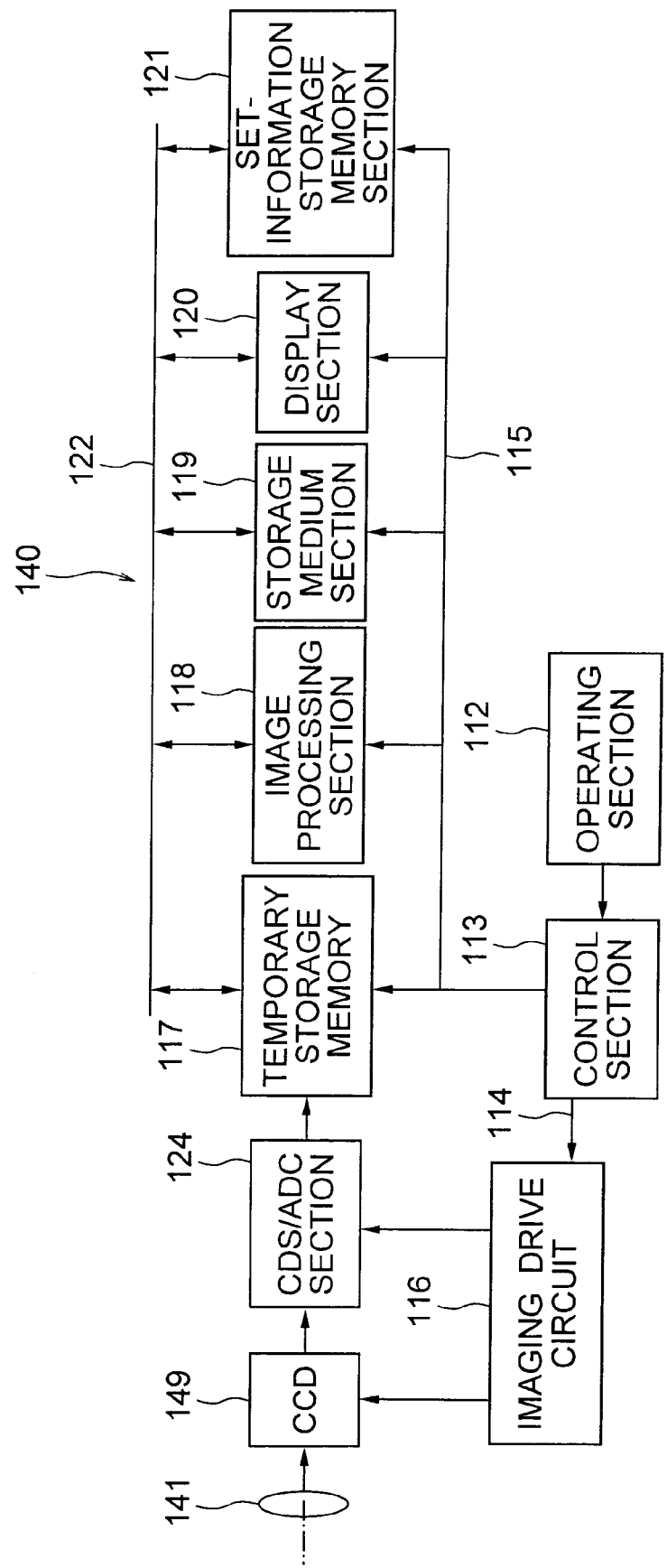
FIG. 14 is a block diagram of an internal circuit of a principal portion of the digital camera.

FIG. 14 is a structural block diagram of an internal circuit of main components of the digital camera 140. In the following description, the processing means 151 described above includes for instance, a CDS/ADC section 124, a temporary storage memory 117, and an image processing section 118, and a storage means 152 consists of a storage medium section 119 for example.

As shown in FIG. 14, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (bare data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 140 structured in such manner has the taking optical system 141, according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side and the telephoto side is possible.

As described above, the zoom lens according to the present invention is useful for achieving an adequately high zoom ratio while preventing an increase in the entire length of the zoom lens in the zoom range near the telephoto end.

According to the present invention, there can be provided a zoom lens that is advantageous in achieving an adequately high zoom ratio while preventing an increase in the entire length of the zoom lens in the zoom range near the telephoto end.

What is claimed is:

1. A zoom lens comprising, in order from an object side thereof:
   a first lens unit having a positive refracting power;
   a second lens unit having a negative refracting power; and
   a rear group having a positive refracting power that comprises at least one lens unit, a lens unit located closest to the object side in the rear group being a third lens unit having a positive refracting power, wherein
   the zoom lens comprises an aperture stop disposed closer to an image side than the second lens unit and closer to the object side than a lens surface closest to the image side in the third lens unit,
   during zooming from a wide angle end to a telephoto end in a state in which the zoom lens is focused on an object at a farthest distance, a distance between the first lens unit and the second lens unit is larger at the telephoto end than at the wide angle end, and a distance between the second lens unit and the third lens unit is smaller at the telephoto end than at the wide angle end,
   the first lens unit moves during zooming from the wide angle end to the telephoto end and is located closer to the object side at the telephoto end than at the wide angle end,
   the second lens unit moves during zooming from the wide angle end to the telephoto end and finally moves toward the image side,
   during zooming from the wide angle end to the telephoto end, the aperture stop first moves toward the object side, assumes a state in which it is located closest to the object side at an intermediate point in zooming from the wide angle end to the telephoto end, then reverses its moving direction in this state, and is located closer to the object side at the telephoto end than at the wide angle end,
   during zooming from the wide angle end to the telephoto end, the third lens unit first moves toward the object side, assumes a state in which it is located closest to the object side at an intermediate point in zooming from the wide angle end to the telephoto end, then reverses its moving direction in this state, and is located closer to the object side at the telephoto end than at the wide angle end,
   when an intermediate zoom state is defined as a state in which the third lens unit is located closest to the object side, the first lens unit is located closer to the object side in the intermediate zoom state than at the wide angle end, and the aperture stop is located closer to the object side in the intermediate zoom state than at the wide angle end, and
   the zoom lens satisfies the following conditional expression:

$1.3 < f_3/|f_2| < 3.0$ where $f_3$ is a focal length of the third lens unit, and $f_2$ is the focal length of the second lens unit.

2. The zoom lens according to claim 1, wherein the zoom lens satisfies the following conditional expression:

$8.0 < f_t/f_w < 25.0$ where $f_t$ is a focal length of the entire zoom lens system at the telephoto end, and $f_w$ is the focal length of the entire zoom lens system at the wide angle end.

3. The zoom lens according to claim 1, wherein during zooming from the wide angle end to the telephoto end, the first lens unit first moves toward the object side.

4. The zoom lens according to claim 1, wherein the first lens unit moves in such a way that the following conditional expression is satisfied:

$0.55 < (T1_m - T1_w)/(T1_t - T1_w) < 1.3$ where $T1_w$ is an actual distance on an optical axis from a lens surface located closest to the object side in the first lens unit to an image plane at the wide angle end, $T1_m$ is the actual distance on the optical axis from the lens surface located closest to the object side in the first lens unit to the image plane in the intermediate zoom state, and $T1_t$ is the actual distance on the optical axis from the lens surface located closest to the object side in the first lens unit to the image plane at the telephoto end.

5. The zoom lens according to claim 1, wherein the second lens unit is located closer to the image side at the telephoto end than at the wide angle end.

6. The zoom lens according to claim 1, wherein during zooming from the wide angle end to the telephoto end, the second lens unit first moves toward the object side.

7. The zoom lens according to claim 1, wherein the third lens unit moves in such a way that the following conditional expression is satisfied:

$1.0 < (T3_m - T3_w)/(T3_t - T3_w) < 1.5$ where $T3_w$ is an actual distance on an optical axis from a lens surface located closest to the object side in the third lens unit to the image plane at the wide angle end, $T3_m$ is the actual distance on the optical axis from the lens surface located closest to the object side in the third lens unit to the image plane in the intermediate zoom state, and $T3_t$ is the actual distance on the optical axis from the lens surface located closest to the object side in the third lens unit to the image plane at the telephoto end.

8. The zoom lens according to claim 1, wherein the zoom lens satisfies the following conditional expression:

$0.3 < f_m/f_t < 0.9$ (5)

where $f_m$ is a focal length of the entire zoom lens system in the intermediate zoom state, and $f_t$ is the focal length of the entire zoom lens system at the telephoto end.

9. The zoom lens according to claim 1, wherein
   The first lens unit comprises at most two lenses,
   the third lens unit comprises at most two lenses, and wherein
   each of the first lens unit, the second lens unit and the third lens unit has at least one aspheric surface.

10. The zoom lens according to claim 9, wherein the second lens unit comprises a plurality of negative lenses and at least one positive lens.

11. The zoom lens according to claim 1, wherein
the rear lens group comprises a fourth lens unit having a positive refracting power disposed on the image side of the third lens unit, and
during zooming from the wide angle end to the telephoto end, the fourth lens unit moves in such a way that the distance between the fourth lens unit and the third lens unit changes, and the fourth lens unit is located closer to the image side at the telephoto end than at the wide angle end.

12. The zoom lens according to claim 11, wherein during zooming from the wide angle end to the telephoto end, the fourth lens unit first moves toward the object side and thereafter moves toward the image side.

13. The zoom lens according to claim 11, wherein
the fourth lens unit comprises one positive lens having an aspheric surface,
the total number of lenses included in the fourth lens unit is one, and
the absolute value of a paraxial curvature of an image side surface of the positive lens in the fourth lens unit is larger than the absolute value of a paraxial curvature of an object side surface of the positive lens.

14. The zoom lens according to claim 13, wherein the positive lens in the fourth lens unit is a positive meniscus lens having a convex surface directed toward the image side.

15. The zoom lens according to claim 1, wherein the zoom lens satisfies the following conditional expression:

$$0.6 < T1_t/f_t < 0.9 \quad (6)$$

where $T1_t$ is an actual distance on an optical axis from a lens surface closest to the object side in the first lens unit to the image plane at the telephoto end, and $f_t$ is a focal length of the entire zoom lens system at the telephoto end.

16. An image pickup apparatus comprising:
a zoom lens according to claim 1; and
an image pickup element disposed on the image side of the zoom lens that converts an image formed by the zoom lens into an electrical signal.

17. The image pickup apparatus according to claim 16, further comprising an image processing section that performs signal processing that corrects aberration contained in an image represented by the electrical signal.

18. The zoom lens according to claim 12, wherein
the fourth lens unit comprises one positive lens having an aspheric surface,
the total number of lenses included in the fourth lens unit is one, and
the absolute value of a paraxial curvature of an image side surface of the positive lens in the fourth lens unit is larger than the absolute value of a paraxial curvature of an object side surface of the positive lens.

* * * * *